(12) United States Patent
DeWoolfson

(10) Patent No.: US 7,979,468 B2
(45) Date of Patent: Jul. 12, 2011

(54) DATABASE DATA DICTIONARY

(75) Inventor: Bruce Randall DeWoolfson, Potomac Falls, VA (US)

(73) Assignee: Enterprise Elements, Inc., Reston, VA (US)

( * ) Notice: Subject to any disclaimer, the term of this patent is extended or adjusted under 35 U.S.C. 154(b) by 618 days.

(21) Appl. No.: 11/917,410

(22) PCT Filed: Jun. 14, 2006

(86) PCT No.: PCT/US2006/023242
§ 371 (c)(1),
(2), (4) Date: Dec. 13, 2007

(87) PCT Pub. No.: WO2006/138420
PCT Pub. Date: Dec. 28, 2006

(65) Prior Publication Data
US 2009/0313278 A1    Dec. 17, 2009

Related U.S. Application Data

(60) Provisional application No. 60/690,147, filed on Jun. 14, 2005.

(51) Int. Cl.
*G06F 7/00* (2006.01)
*G06F 17/30* (2006.01)
(52) U.S. Cl. .................. 707/790; 707/793; 707/802
(58) Field of Classification Search .................. None
See application file for complete search history.

(56) References Cited

U.S. PATENT DOCUMENTS

| | | | |
|---|---|---|---|
| 6,587,856 B1* | 7/2003 | Srinivasan et al. | 1/1 |
| 6,708,186 B1* | 3/2004 | Claborn et al. | 1/1 |
| 7,266,565 B2* | 9/2007 | Diab | 1/1 |
| 7,418,459 B2* | 8/2008 | Gupta | 1/1 |
| 2006/0190478 A1* | 8/2006 | Owens et al. | 707/102 |
| 2006/0218177 A1* | 9/2006 | Chang et al. | 707/102 |
| 2008/0201358 A1* | 8/2008 | Calusinski | 707/102 |

OTHER PUBLICATIONS

"Ontologies and Diagrams for Software and Systems Engineering: processes and objects", by Roel Wieringa, Jan. 23, 2000.*
Jodlowski, et al., "Objects and Roles in the Stack-Based Approach", XP-002401006, Proc. of the 13th International Conference on Database and Expert Systems Applications (DEXA 2002), vol. 2453, pp. 514-523, (Sep. 2, 2002).
Habela, et al., "Overcoming the Complexity of Object-Oriented DBMS Metadata Management", XP-002401007, Proc. of the 9th International Conference Object-Oriented Information Systems (OOIS 2003), pp. 214-225, (Sep. 2, 2003).

(Continued)

*Primary Examiner* — Jay A Morrison
(74) *Attorney, Agent, or Firm* — Finnegan, Henderson, Farabow, Garrett & Dunner, LLP

(57) ABSTRACT

Systems and methods are provided for manipulating data sets. In accordance with one implementation, a computerized system is provided for storing, managing, indexing, interrelating, and/or retrieving data sets in a manner independent of the data model. The system includes an element module configured to store and uniquely identify elements and an element relation module configured to store relationships between the elements in the element module. The computerized system may also comprise a class module configured to store attributes of elements in a class and a type definition module configured to define the class and the attributes related to the class. The computerized system may further comprise a state machine module, the state machine module including a state machine transition module and a status module.

39 Claims, 19 Drawing Sheets

OTHER PUBLICATIONS

Blaha, et al., "Converting OO Models into RDBMS Schema", XP-002401008, IEEE Software USA, vol. 11, No. 3, pp. 28-39, (May 1994).

Arsov, et al., "An Approach for Design of the Object-Oriented Databases with Restricted Natural Language Access", XP-002401009, Proc. of the 4th International Conference Conference on Computer Systems and Technologies: E-Learning, pp. 147-152, (Jun. 19, 2003).

Jerke, et al., "Building Database-Driven Flash Applications", XP-002401199, Apress, Springer-Verlag Berlin and Heidelberg GmbH & Co. KG, pp. 119-170, (Oct. 2003).

* cited by examiner

DATABASE DATA DICTIONARY

CROSS-REFERENCE TO RELATED APPLICATION(S)

This application claims the benefit of priority from U.S. Provisional Application No. 60/690,147, entitled "Database Data Dictionary," filed Jun. 14, 2005, the disclosure of which is expressly incorporated herein by reference to its entirety.

TECHNICAL FIELD

This invention relates to the field of computer data storage. More particularly, the present invention relates to methods and systems for storing, managing, indexing, interrelating, and/or retrieving data sets.

BACKGROUND INFORMATION

Currently, a conventional data storage system implements its own data model according to the user interface and the business rules specification for that system. For the conventional system, the system's developers write dedicated code and user interface code that displays or manages certain data inputs such as check boxes, lists, combo boxes or other data inputs. Such systems depend upon a specific data model and lack flexibility and portability. The conventional system's dedicated code and user interface in some respects manipulate the data that the conventional system's application stores and retrieves during operation. Moreover, the conventional system stores and retrieves data locally on a local disk, such as a C drive on a Windows system. It is well known that conventional systems may also store data on a remote storage media, e.g. a file server or database.

There are efforts to overcome the lack of flexibility and portability of conventional data storage systems, such as the adoption and utilization of extensible markup language for storing data (e.g., Microsoft Office® XML Open Format, OASIS Open Office XML Format, etc). Data files in open data formats (e.g., XML) facilitate data transfer and are typically stored on a desktop machine. XML data files rely on the structures defined by XML standards, which allows standardized XML parsers to read data files expressed in XML format.

However, open data formats based on XML and other open standards do not interrelate and manage dynamic data sets through process and collaboration and state machines. Open data formats (e.g., XML) also do not provide for inheritance and override behaviors, collaboration or state machine process enforcement, and/or element style normalization.

Accordingly, there is a need for systems and methods that store, manage, index, interrelate, and/or retrieve data sets in a manner independent of the data model.

SUMMARY

In accordance with the principles of the present invention, as embodied and broadly described herein, methods, systems and computer program products are provided for manipulating data sets. The data set manipulation may be achieved through utilization of a processor and a data repository adapted to process, retrieve, and store data contained in the data sets and one or more layers of metadata of the data in the data sets.

According to one embodiment, a system is provided for manipulating data sets. The system comprises a processor and a repository, the data repository including an element module configured to store and uniquely identify a plurality of elements each identified by a unique element identification, an element relation module configured to store one or more relationships between the elements in the element module, and a class module configured to define at least one class of the elements and store the class. The data repository further includes an attribute module configured to define and store the attributes, a class attribute module configured to define and store one or more class-attribute associations between at least one of the attributes and the class, and a type definition module configured to define and store one or more types of the class, the attributes related to the class, and the relationships between the elements.

According to another embodiment, a method is provided for manipulating data sets. The method comprises storing and uniquely identifying a plurality of elements in a data repository, each of the elements identified by a unique element identification, wherein the data repository is adapted to process, retrieve, and store data contained in the data sets and one or more layers of metadata of the data in the data sets, and storing one or more relationships between the elements in the data repository. The method further comprises defining at least one class of the elements and storing the class in the data repository, defining one or more attributes and storing the attributes in the data repository, defining one or more class-attribute associations between at least one of the attributes and the class and storing the class-attribute associations in the data repository, and defining one or more types of the class, the attributes related to the class, and the relationships between the elements, and storing the types in the data repository.

Another exemplary embodiment provides for a computer-readable medium containing instructions to configure a processor to perform a method for manipulating data sets. The method comprises storing and uniquely identifying a plurality of elements in a data repository, each of the elements identified by a unique element identification, wherein the data repository is adapted to process, retrieve, and store data contained in the data sets and one or more layers of metadata of the data in the data sets, and storing one or more relationships between the elements in the data repository. The method further comprises defining at least one class of the elements and storing the class in the data repository, defining one or more attributes and storing the attributes in the data repository, defining one or more class-attribute associations between at least one of the attributes and the class and storing the class-attribute associations in the data repository, and defining one or more types of the class, the attributes related to the class, and the relationships between the elements, and storing the types in the data repository.

Additional aspects of the invention are set forth in the detailed description which follows or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

Both the foregoing general description and the following detailed description are exemplary and explanatory only. They do not restrict the invention, as claimed. Furthermore, the accompanying drawings, which are incorporated in and constitute a part of this specification, illustrate embodiments of the invention and together with the description, serve to explain the principles of the invention. In the drawings:

DETAILED DESCRIPTION

Reference will now be made in detail to present embodiments of the invention, examples of which are illustrated in the accompanying drawings. Wherever possible, the same reference numbers will be used throughout the drawings to refer to the same or like parts.

Entity-Relationship Configuration

Figure 1A:
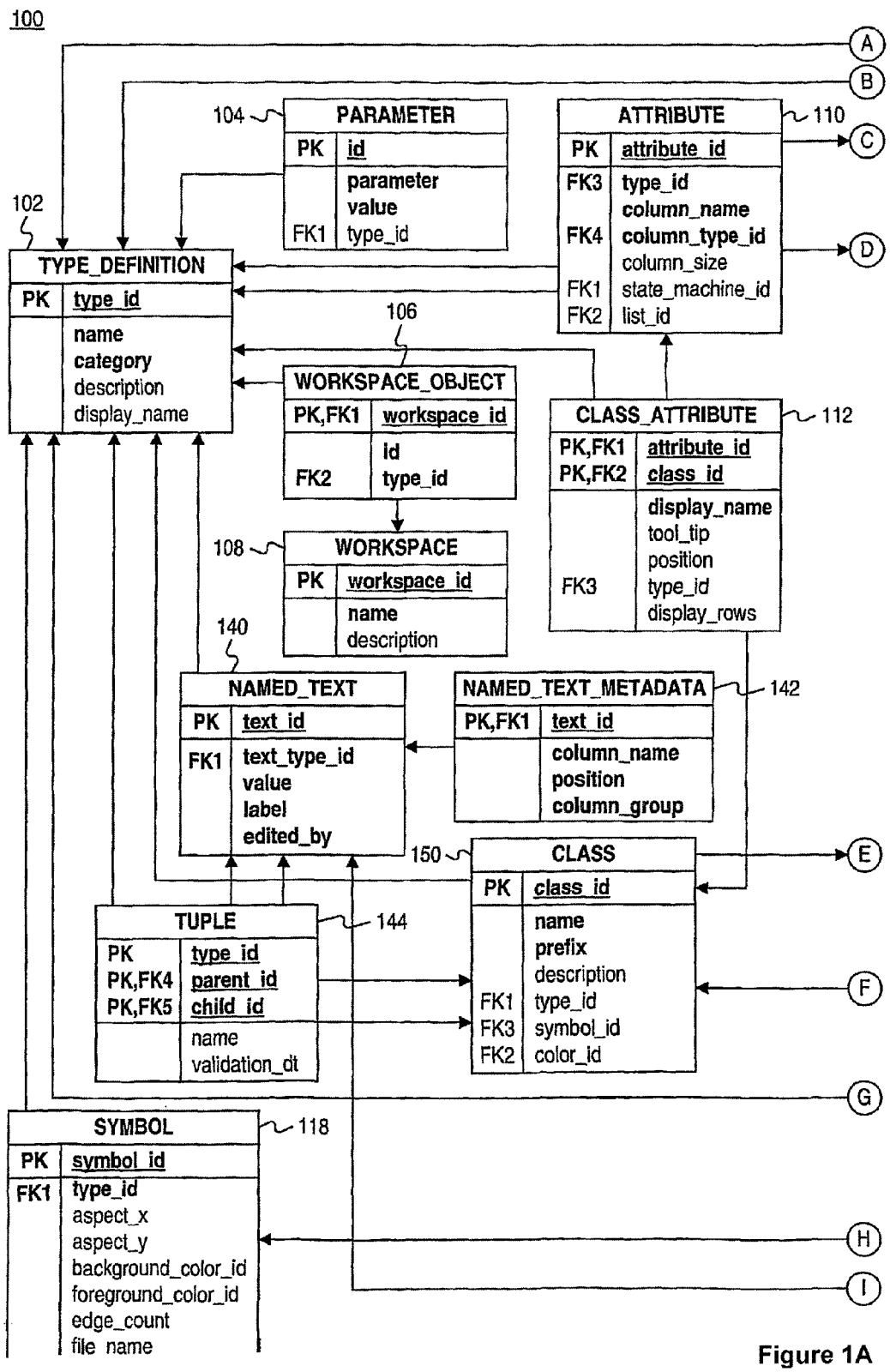
FIG. 1 is an exemplary entity-relationship diagram of an elements metadata repository (EMR) for storing, managing, indexing, interrelating, and/or retrieving data sets, consistent with the principles of the present invention.
Figure 1B:
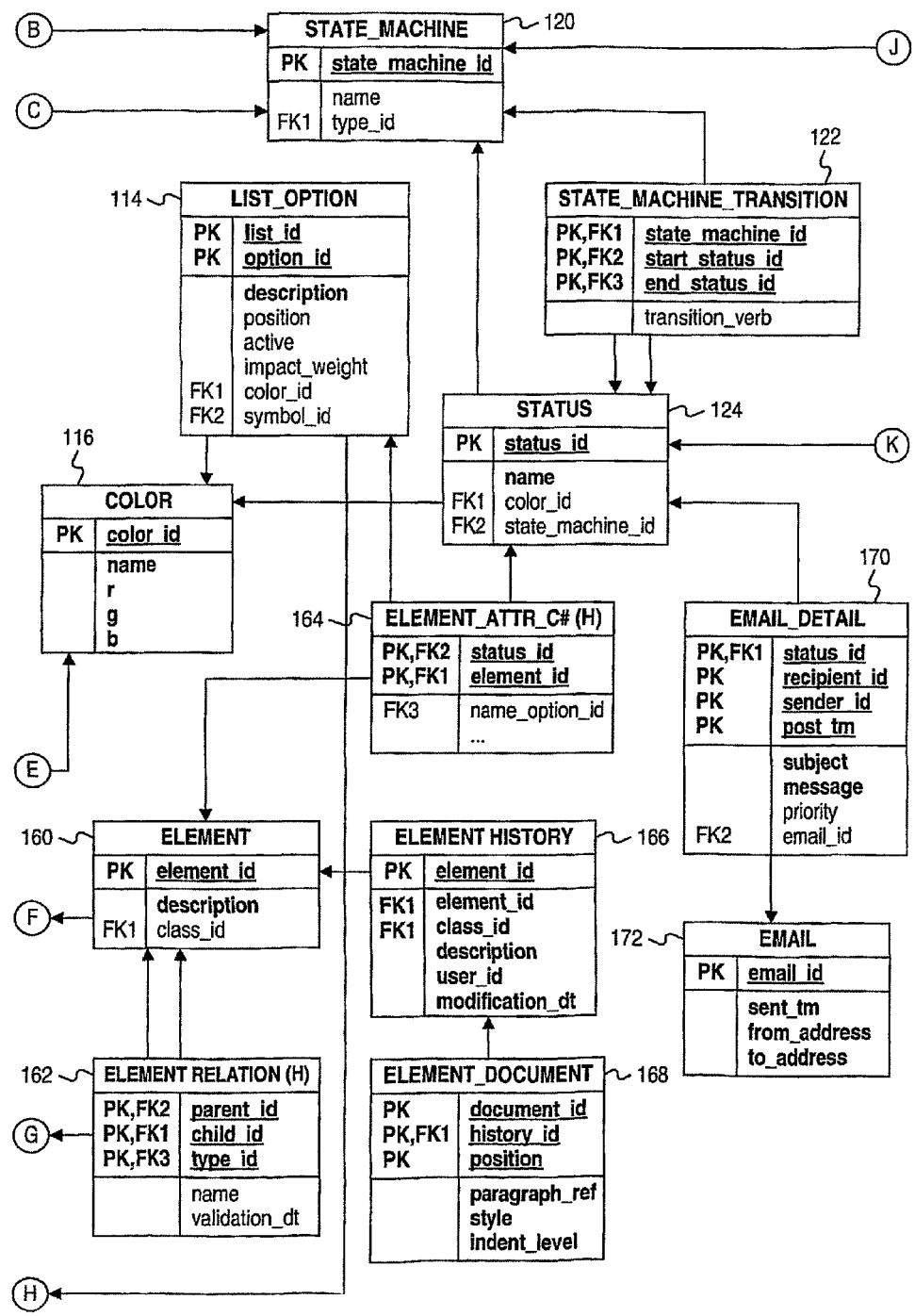
Figure 1C:
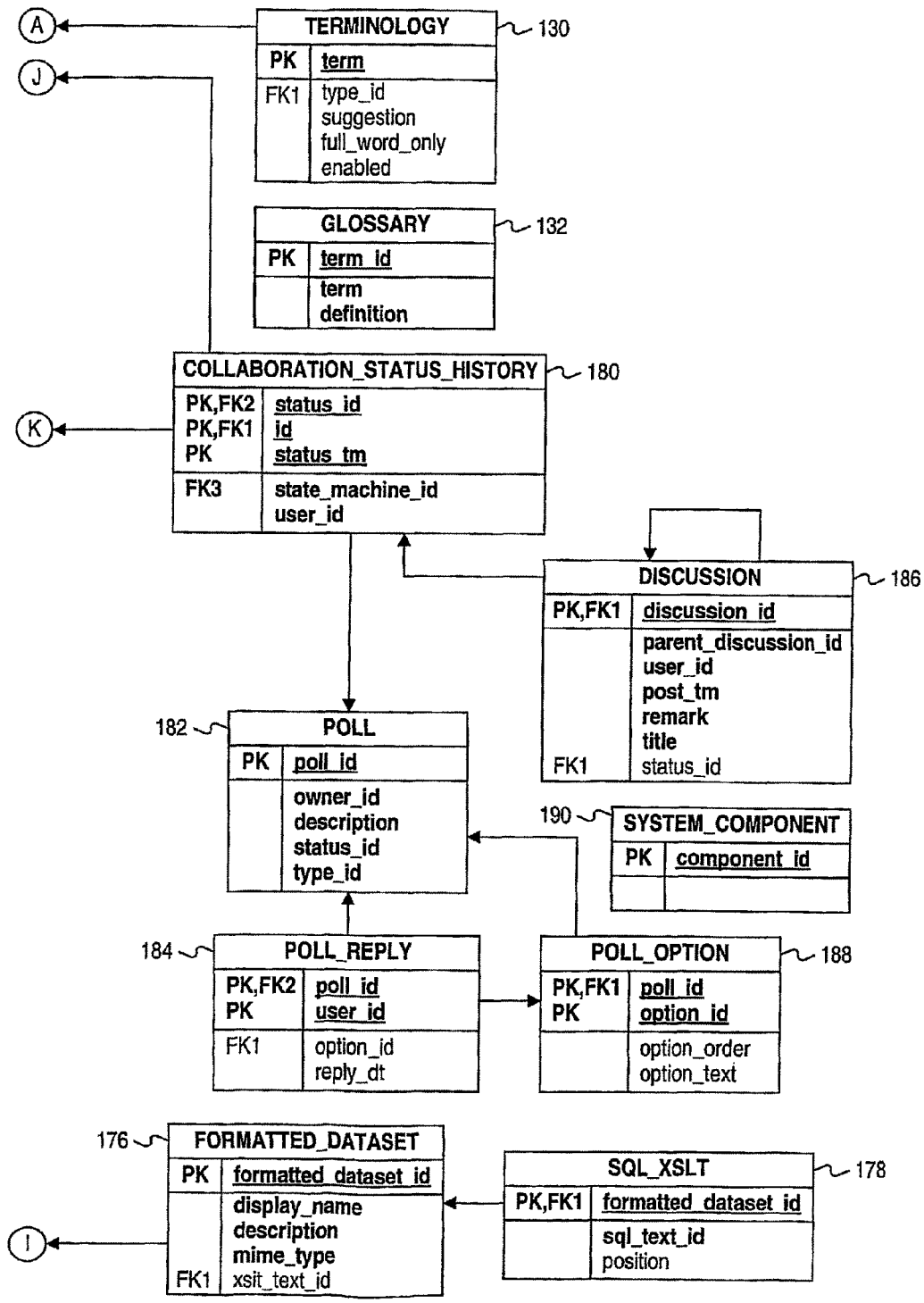

FIG. 1 shows an entity relationship diagram 100 of an elements metadata repository (EMR) for storing, managing, indexing, interrelating, and/or retrieving data sets, consistent with principles of the present invention. In accordance with embodiments of the invention, a repository, such as the EMR, is a central place where data and metadata is stored and maintained. Metadata is data that is used to describe other data. Examples of metadata include schema, tables, indices, views, column definitions, etc. Metadata is recursive such that data about data about the data may be stored. This recursive nature may be expressed as levels, such as "M" number of levels. For example, the actual data being stored is M0. Data about that actual data (i.e., M0) may be referred to as M1. Data about the M1 layer data may be referred to as M2 and so on. In this example, the M1 and M2 layers are metadata, i.e., data about data. The EMR of FIG. 1 allows for storage of any number of data layers.

Figure 2:
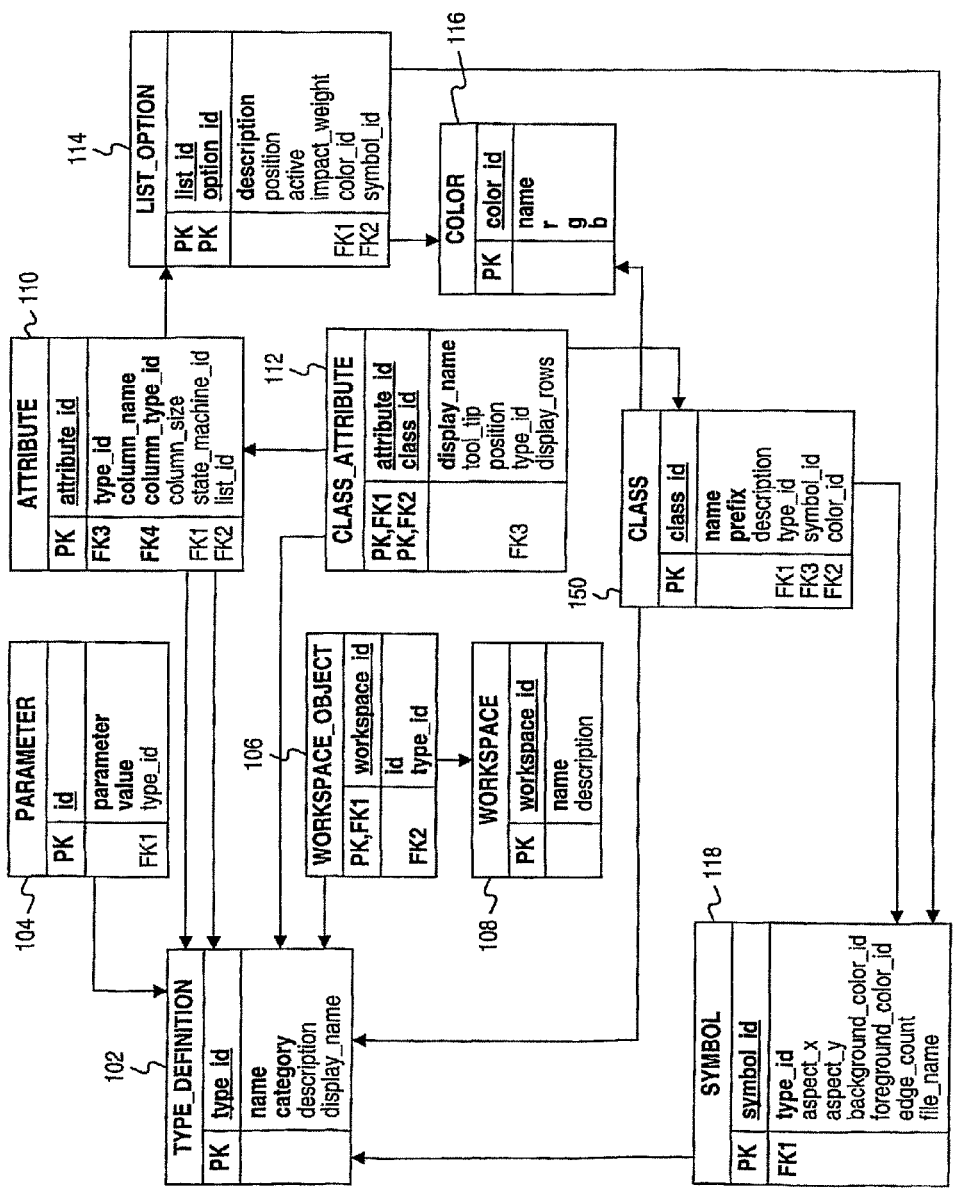
FIG. 2 depicts a subset of the exemplary entity-relationship diagram of the EMR, illustrating data tables for storing articulated types, workspaces and workspace objects, class and class attributes, parameters, list options, etc.

Embodiments of the present invention, as shown in FIG. 2, include a class table 150, which may be analogous to a relational database table. Just as a table contains columns, a class, such as an entry in class table 150, contains attributes. In an exemplary implementation of the EMR, using database systems such as Oracle®, Microsoft SQL Server®, or MySQL, a user may create a class and its attributes by creating a table and constructing columns within the table. In other words, the user creates a class and populates the class with attributes where attributes are conceptually other pieces of information of interest to the things that the class is trying to describe. For instance, if the class was a person, an attribute may be the person's name, birth date, or social security number. Any number of attributes can be assigned to any number of classes.

Unlike a conventional relational database, the EMR extends the notion of available attributes types beyond the standard string, number, and date types. To do so, the EMR allows dynamically extendable entries in a type definition table 102. Type definition table 102 may store articulated types that may be, for example, an M4 layer while still maintaining the meta meta meta meta data language. By using the type of the person's name for an attribute, the user can declare more than what a normal relational database may store. For example, the EMR provides for a boolean type which is not normally found in a relational database. The EMR also provides for a pick list type, which stores a plurality of optional selections, and restricts actual data settings to none, or one and only one of the optional selections. The pick list type is also not found in a relational database. Moreover, the EMR is capable of storing a process or state machine type which is not found in a relational database. All these data types provide flexibility in the type of data management that can be performed.

In accordance with still further embodiments of the invention, the EMR includes a parameter table 104. Parameter table 104 allows for any unforeseen attribute values to be placed upon system level components without redefining the base schema. For instance, if one type of named text is a SQL query, and the system requires security settings on that one type of named text (further described below), then a parameter entry can be used to specify that setting instead of redefining named_text table (e.g. named_text table 140 in FIG. 8) to include an additional column, which may or may not be needed for all other named text types.

Embodiments of the present invention, as shown in FIG. 2, include a workspace table 108 and a workspace_object table 106. Workspace table 108 and workspace_object table 106 provide for logical grouping of elements into subsets that are usable for particular users or purposes. For example, if an EMR user is a tester, then a "Testing" workspace may be declared. Objects, including elements, classes, named texts, and "things" that is defined by a numeric identifier (Which may be every "thing") may be placed into 'Testing' workspace via entries in workspace_object table 106. The tester would be assigned to this workspace (also through workspace_object table 106), and therefore only be permitted to see the other objects in the workspace. The effect is a basic level of security and data volume reduction to small localized easily navigable subsets.

Consistent with embodiments of the invention, an attribute table 110 holds the definition of each attribute used in each class in the EMR. Attribute table 110 may store the physical name and type of the data which corresponds to the database column name and column type where the actual values are stored. A class_attribute table 112 may associate a given attribute to one or more classes (in class table 150). Because class_attribute table 112 allows for one attribute to be referenced by many classes, there is attribute inheritance among the classes. Attribute inheritance among the classes is a powerful notion not found in traditional relational database management systems (RDBMS). Class_attribute table 112 stores the logical name that may be used by the attribute when presented to the user for data manipulation such as insert or update or delete of values. The ability to reference the same attribute via multiple names depending on which class it appears in is akin to the concept of overridden inheritance, also a concept not found in RDBMS.

In an embodiment of the invention, the EMR may immediately create a physical instantiation of the logical class and attribute model as soon as a class attribute definition is entered and committed into class_attribute table 112. The EMR may immediately represent the table and columns that the class and attribute definitions dictate. Moreover, the EMR's editors (see, for example, FIGS. 14 and 15) may immediately conform to this definition and support full data manipulation of any values in any defined attribute. Furthermore, when certain types of attributes are attached to a class, appropriate named text entries are automatically created and tupled to the class and may be immediately available for use in the EMR. For example, if a pick list attribute type is added to a class, then queries that returns, for instance, all rows in the class and how many rows fall into each of the available pick list options, are automatically created, which allows the EMR to present the results (via charts or other presentation formats) to the users. This immediate construction of physical storage, complete editing capability, and automated reporting allows the EMR to become operational immediately upon logical schema definition.

Embodiments of the present invention, as shown in FIG. 2, further include a list_option table 114. List_option table 114 may hold all possible enumerations in all possible pick list attributes, which allows for structured user interface and predictable query structures when displaying and managing pick list data. A color table 116 may hold a record for each enumerated color referenced by any object in the EMR. A color can be declared and associated to an object such as a class, list option selection, or element, etc, and when detected during presentation, the id reference value for the color can be replaced with a swatch of the actual color or any other run time decoration as appropriate.

Consistent with embodiments of the invention, the EMR includes a symbol table 118. Symbol table 118 is similar to color table 116 because it may hold a list of references to graphical objects that can be used in the system. The number and type of graphical objects are not restricted, and can be extended by addition of type definition entries but typically include standard graphic files, such as .BMP, .GIF, JPG, .SVG, and .SVGz. Once declared in this table, these graphical objects can be referenced by any object in the system, and when the reference is detected at display time, the reference may be replaced with a rendering of the actual image. For example, reports may be constructed that show check marks, colored balls, military insignia, or any other relevant image depending on the needs of the visualization.

The EMR of FIG. 1 conceptually breaks the world into an articulation of "things." The EMR places these "things" into one pile in an element table 160. An element stored in element table 160 implies that the user can find similarity between any "thing" that the user would like to discuss, report, store, or manage. Element table 160 provides the user the capability to add those "things" into a congruous pile so that the user can deal with them without regard to their exact nature. This provides an over-normalization of any data captured by the EMR into one record type called an element.

Figure 3:
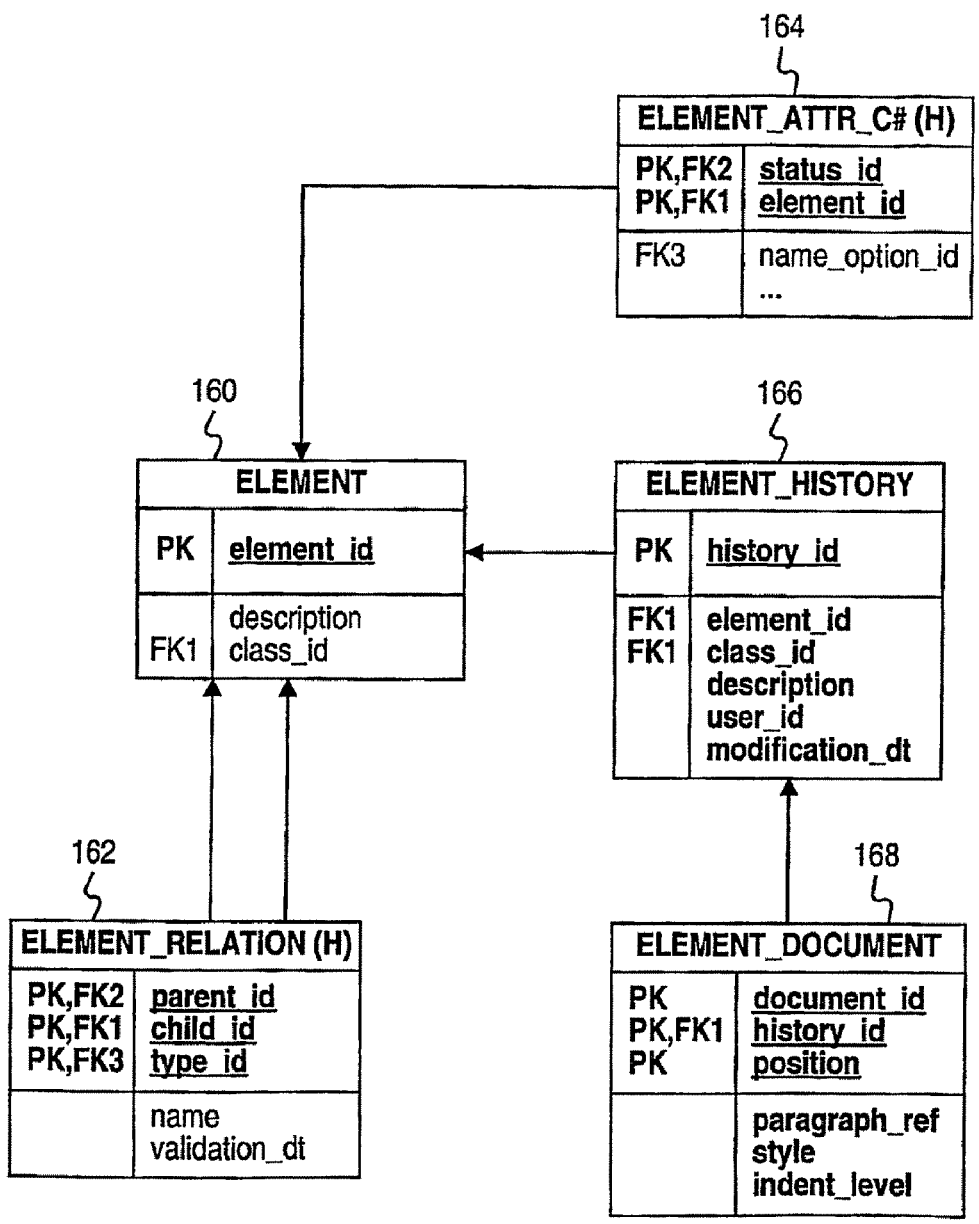
FIG. 3 depicts a subset of the exemplary entity-relationship diagram of the EMR, illustrating data tables for storing elements, element relations, element attributes, element history, element documents, etc.

FIG. 3 illustrates an exemplary element, which has a unique identifier (e.g., element ID), a name (e.g., description), and a classification (e.g., class identifier). Consistent typing of the element ID permits the user to refer to elements across the schema without having to convert the type of the element ID. In one embodiment, the element ID takes on a number format, e.g., a long value or an integer value. In this embodiment, any "thing" in the world may be uniquely identified by a number, e.g., an integer. Moreover, once any "thing" has been differentiated from nothingness, the "thing" has a name. This name may be called a description. In one embodiment, the key components of the element are the element ID and the name, as shown in element table 160. The description does not have to be unique. Some "things" may be described generally with the same name but have differences that render those things unique from each other. Another component of the element is a class identifier. The class identifier is a pointer or an indicator of the type or classification of this element in the universe. The class identifier allows the EMR to articulate the differences between types of elements that otherwise appear to be similar.

Embodiments of the present invention include an element_relation table 162 for storing relationships between elements. Further to storing and managing elements in the universe, the EMR of FIG. 1 records and manages the fact that one element relates to another element in element_relation table 162. Each entry in element_relation table 162 may contain a pointer to at least two elements in elements table 160 and a type definition describing the type of relationship. Using the over-normalized model, the EMR ends up with a collection of elements and a collection of indicators of how those elements relate to each other.

Embodiments of the present invention, as shown in FIG. 3, include an element_attr_c# table 164. Element_attr_c# table 164 represents a plurality of physical tables that are constructed into the base RDBMS. A physical table may be constructed in element_attr_c# table 164 for each class that is declared in class table 150. A column is inserted into this table for each class_attribute entry that specifies an attribute that should be in this class. In the physical implementation the # symbol is replaced with the identifier of the class to ensure uniqueness in table names, which is a requirement in the RDBMS but not necessarily in the class names of the element system.

For each element_attr_c# table constructed, a corresponding entry in an element_history table 166 may also be constructed. Element_history table 166 records each version of each element through its lifespan in the EMR. In addition to all values of all attributes, element_history table 166 may also store indicators of the user making the change, and the time the change was made. This provides the EMR the capability to provide a complete history for all tracked elements throughout the life of the elements. This is useful for recovering a point in time configuration, or mixing historic version of various element subsets into named groups sometimes referred to as Baselines, Blocks, Revisions, Versions, Variants, or the like.

Consistent with embodiments of the invention, the EMR includes an element_document table 168, which may represent a series of records that logically group a set of elements into what would traditionally be called a document. Element_document table 168 provides for formatting information that is separated from the elements themselves, yet are important for the reconstruction for an ordered formatted display of the elements.

Figure 4:
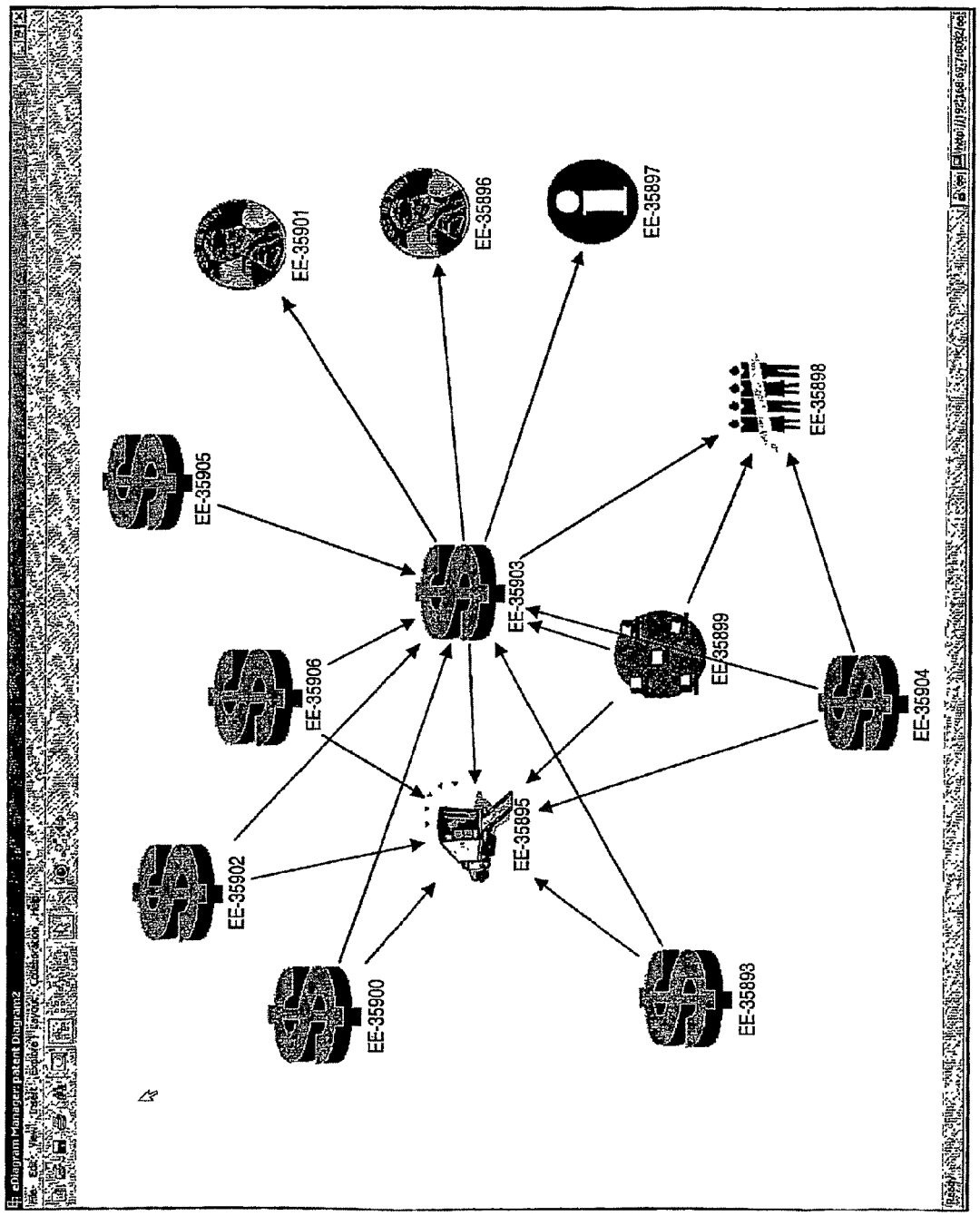
FIG. 4 illustrates an exemplary diagrammatic visualization for visually selecting and relating elements using a graphical user interface (GUI)

From the collection of elements and the collection of indicators, the EMR can create visualizations for users by placing the elements in context with other elements that they relate to. FIG. 4 illustrates an exemplary visualization 400. Visualization 400 may also be called a diagrammatic visualization, which may be implemented by an elements diagram manager. In a diagrammatic visualization, the elements diagram manager selects or allows the user to select subsets of elements in the universe and place them on a drawing canvas. The elements diagram manager then arranges the elements in relation to other elements based on the conductivity rules found in element_relation table 162.

In visualization 400, several elements are arranged on the canvas in proximity to each other and connected by directional lines that indicate their relation to each other, as determined by element_relation table 162. Each element in the canvas may be expanded to find and display elements in proximity to itself that is not yet on the canvas. Visualization 400 provides the user the capability to dynamically explore related elements.

Figure 14:
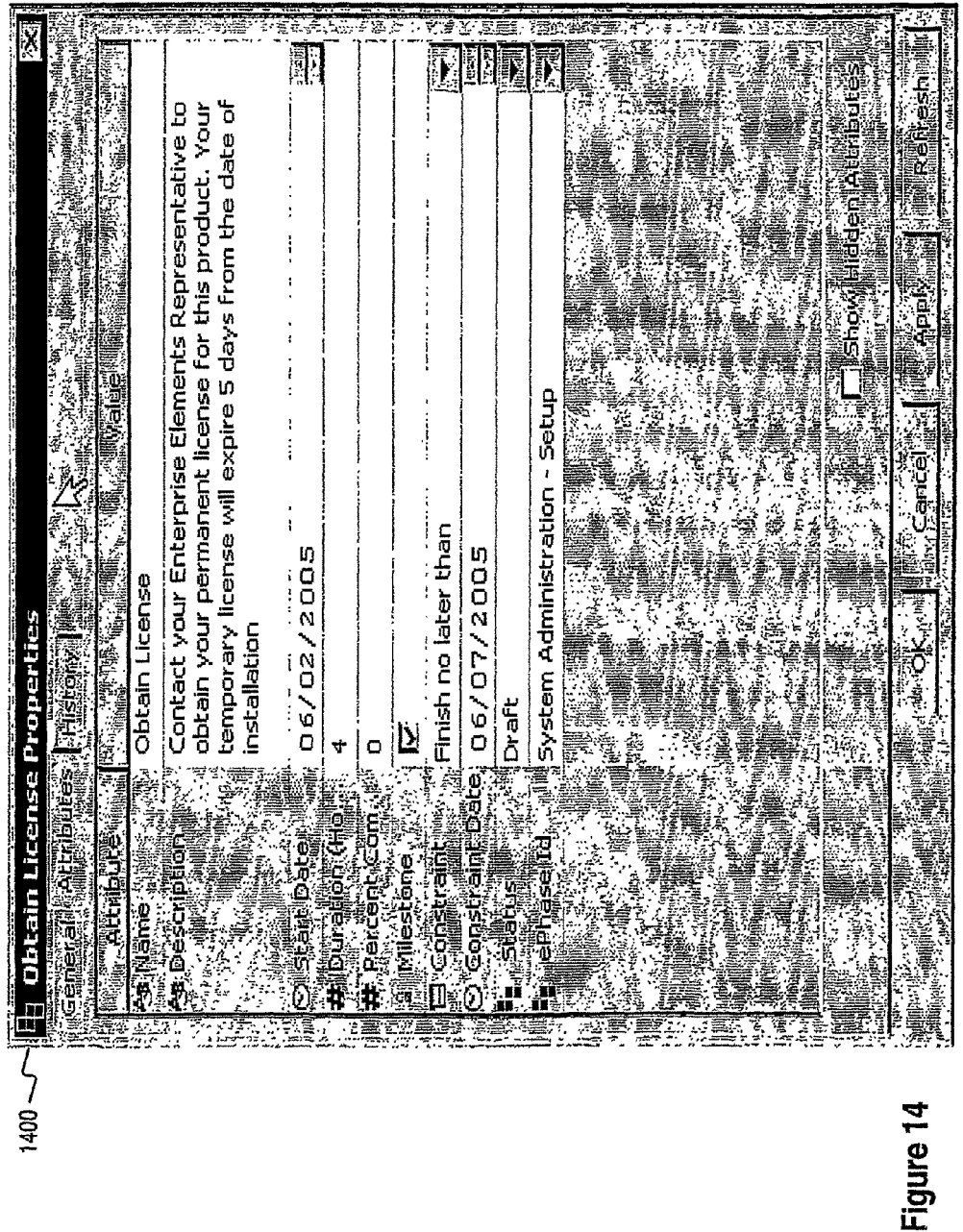
FIGS. 14 and 15 depict GUIs of exemplary editing environments that may be invoked from a displayed element.

In addition to expansion of an element, each element in the EMR may invoke an editing screen that manages the values for the attributes of that element, based on the classification of that element. FIG. 14 displays a screen shot illustrating an exemplary editing environment 1400 that may be invoked from any displayed element, whether it appears in a diagram canvas, element explorer list, or other context.

As illustrated in FIG. 14, editing environment 1400 shows several tabs, a General Tab, an Attributes tab, and a History tab. The selected tab in the example shown in FIG. 14 is the Attributes tab, which displays a listing of each attribute associated with the elements class, and an editor for the value of that attribute. In this example, the type of attribute is indicated by small icons to the left of the attribute name and the editor appears to the right of the attribute name. The order in which the attributes appear and certain display characteristics such as the number of rows of text to display in the edit field are determined by the entry in class_attribute table 112. Specialized editors can be defined and used such as date selectors, pick list combo boxes, and boolean checkboxes, all of which are invoked dynamically based on the definition of the attributes that happen to be in this class.

Figure 15:
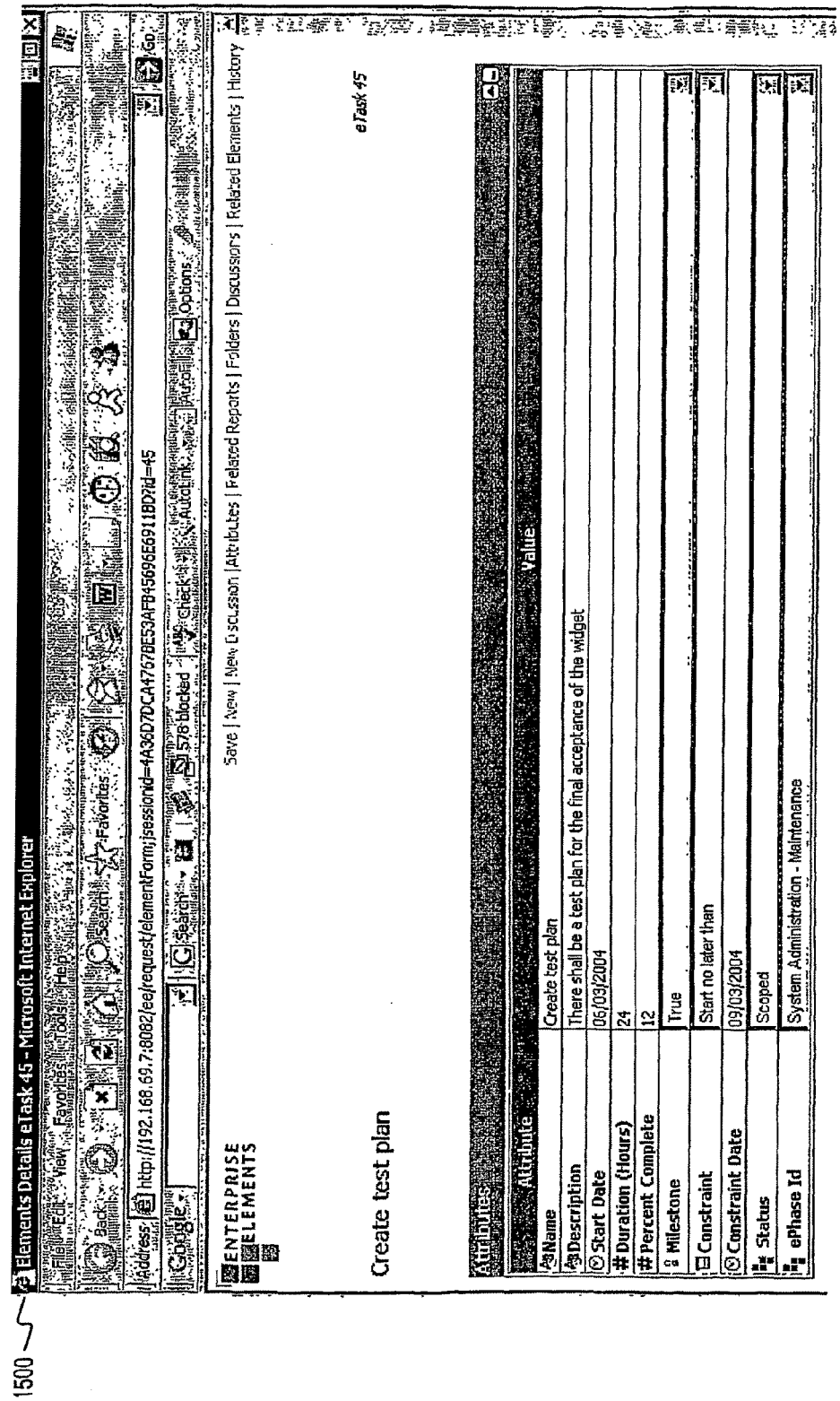

FIG. 15 shows a screen shot of another exemplary representation 1500 of the dynamic editing capability of an element. In this embodiment, the EMR provides dynamic edit capability through web-based programming language and a standard browser without a structured programming language such as Java, as seen in editing environment 1400 (of FIG. 14). By providing web-based edit capability, the EMR allows users to edit attributes of an element by invoking one or more hyperlinks to the element when the element is referenced in other web-based reporting or outputs.

Figure 5:
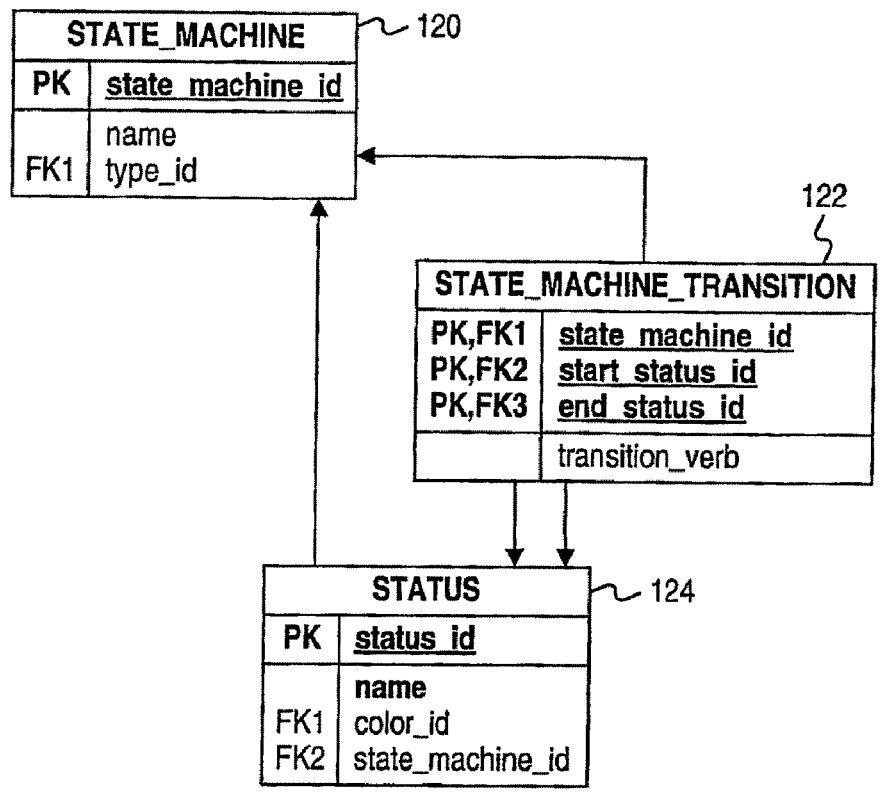
FIG. 5 shows a subset of the exemplary entity-relationship diagram of the EMR, illustrating data tables for storing state machines, state machine transitions, state machine statuses, etc.

State machines are a very powerful extension of normal relational database attributes or column types. As shown in FIG. 5, a state_machine table 120, a state_machine_transition table 122, and a status table 124 describe the structure and behavior of state machines. The term state machine may be used interchangeably with the terms process or workflow. A state machine (e.g., an entry in state_machine table 120) has one or more statuses (e.g., entries in status table 124) which are connected through transitions (e.g., entries in state_machine_transition table 122). The user may classify the elements by declaring one or more possible state machine statuses for each of the elements.

Figure 6:
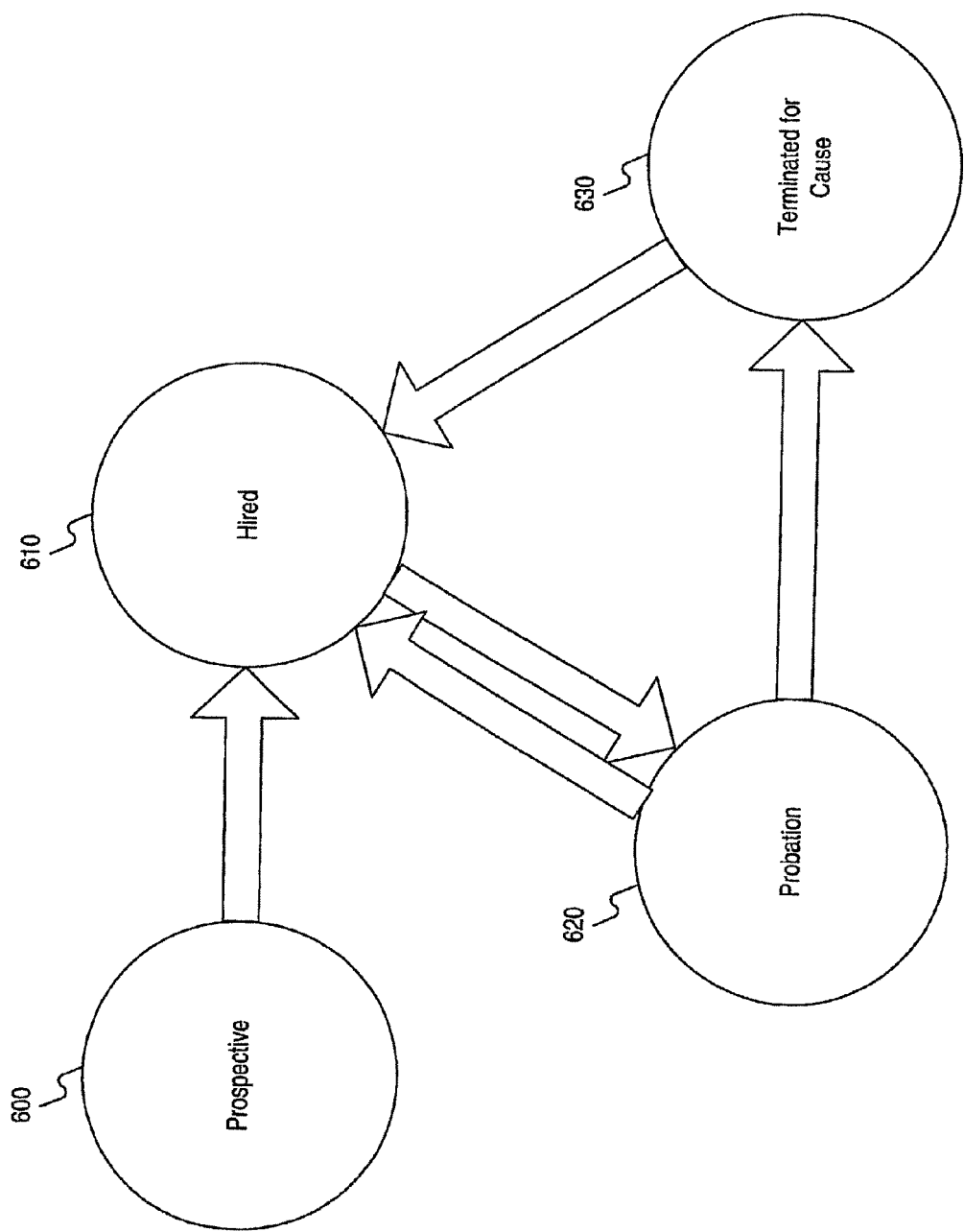
FIG. 6 illustrates an exemplary state machine diagram.

Using the person example, if the person was an employee, then the EMR of FIG. 1 would be able to declare at least one possible status of the person. The EMR could declare the person's status in the state machine model as shown in FIG. 6, such as whether the person is a prospective employee 600, an actively hired employee 610, an employee on probation 620, an employee terminated for cause 630, etc. The EMR may restrict the transition from one status to another by limiting each status's forward transition connections. For instance, the user may first connect prospective employee status 600 to hired status 610. Next, the user may connect hired status 610 to on probation status 620. Furthermore, on probation status 620 may be connected to terminated for cause status 630 or back to hired status 610. Loops and branches are allowable in a stateful process.

The EMR may enforce data behavior and constrain the user's ability to manipulate data based on the state machine model. For one or more stateful models, state machines may be applied to a data classification in a manner that forces data to follow at least one prescribed process declared by the user or a state administrator in a given enterprise. For instance, a prospective employee may not be immediately transitioned to terminated for cause because that violates the rules declared by the process. A prospective employee may only be propagated forward to available or declared next statuses, e.g., hired. Furthermore, the EMR may grant certain users the ability to restrict the condition under which a transition is allowable, for example, only to users in the organization who are authorized to terminate an employee. Although the transition from actively hired to terminated with cause is generally allowed, there may be one or more exclusionary rules that declare that only a certain user or subset of users may transition an actively hired employee to the status of terminated with cause. Other exclusionary rules might state that the user may not transition an actively hired employee to terminated for cause unless the user has entered a cause and linked it by relation to the employee.

There are many types of data models beyond employees, e.g., the Department of Defense core architectural data model (CADM), the Defense Department architectural framework (DODAF), or the Meta Objects Facility (MOF). These are examples of standardized data models for users to store data, and the models are independent of the data definition that the user wishes to implement. The user can implement multiple concurrent disparate data definitions within a single enterprise repository, such as the EMR of FIG. 1.

Currently, when a system is declared, it implements its own data model according to the user interface and the business rules specification for that system. For the conventional system, the system's developers write dedicated code and user interface code that displays or manages certain data inputs such as check boxes, lists, combo boxes or other data inputs. The conventional system's dedicated code and user interface manipulate the data that the system's application stores and retrieves during operation. Moreover, the conventional system stores and retrieves data locally on a local disk, like a C drive on a Windows system.

There are several drawbacks to conventional systems, one of which is that the data is typically stored in a proprietary file, i.e., a file that is a Microsoft Word® document in .doc format that contains proprietary binary code. The contents of that file are not clear unless one uses Microsoft Word® or another tool that can decode the contents. While Microsoft Word® stores textual information and formats information in a proprietary format contained within an operating system level object called a file, the EMR foregoes the file-based implementation in favor of a elements-based implementation. In the elements-based implementation, the contents of what otherwise would be a file are flexibility represented as elements. Therefore, the contents are not restricted to use by a proprietary application, but are concurrently available to all database-aware applications.

In the elements-based implementation, a document would not be represented by a collection of proprietarily stored formatting and textual information. Instead, the document would be stored as an element with, e.g., one element for each sentence in the document. The elements represent a usable chunk of contextualized information, such as a sentence. In the field of ontologies, words in a sentence by themselves have no meaning. An ontology implies context. Words by themselves may have a definition, but for the words to truly convey meaning, the words need to included in at least a phrase and probably a sentence. In the elements-based approach, each of the elements conforms to the rules of generalized things in the universe, and therefore may be reused or referenced to other things in the universe, e.g., through entries in element_relation table 162. Moreover, each of the elements in its own context is also meaningful and reusable.

In implementing a solution for a requirements management problem, people would typically use a conventional document to articulate thousands or hundreds or tens of requirements that they would like a system or systems to achieve. In an embodiment of the elements-based implementation in the EMR, each requirement statement would be an element that the user may associate a process to, independent of any kind of hard-coded association. The user has a choice to declare, on each element, such a process which is automatically enforced for that user.

Figure 7:
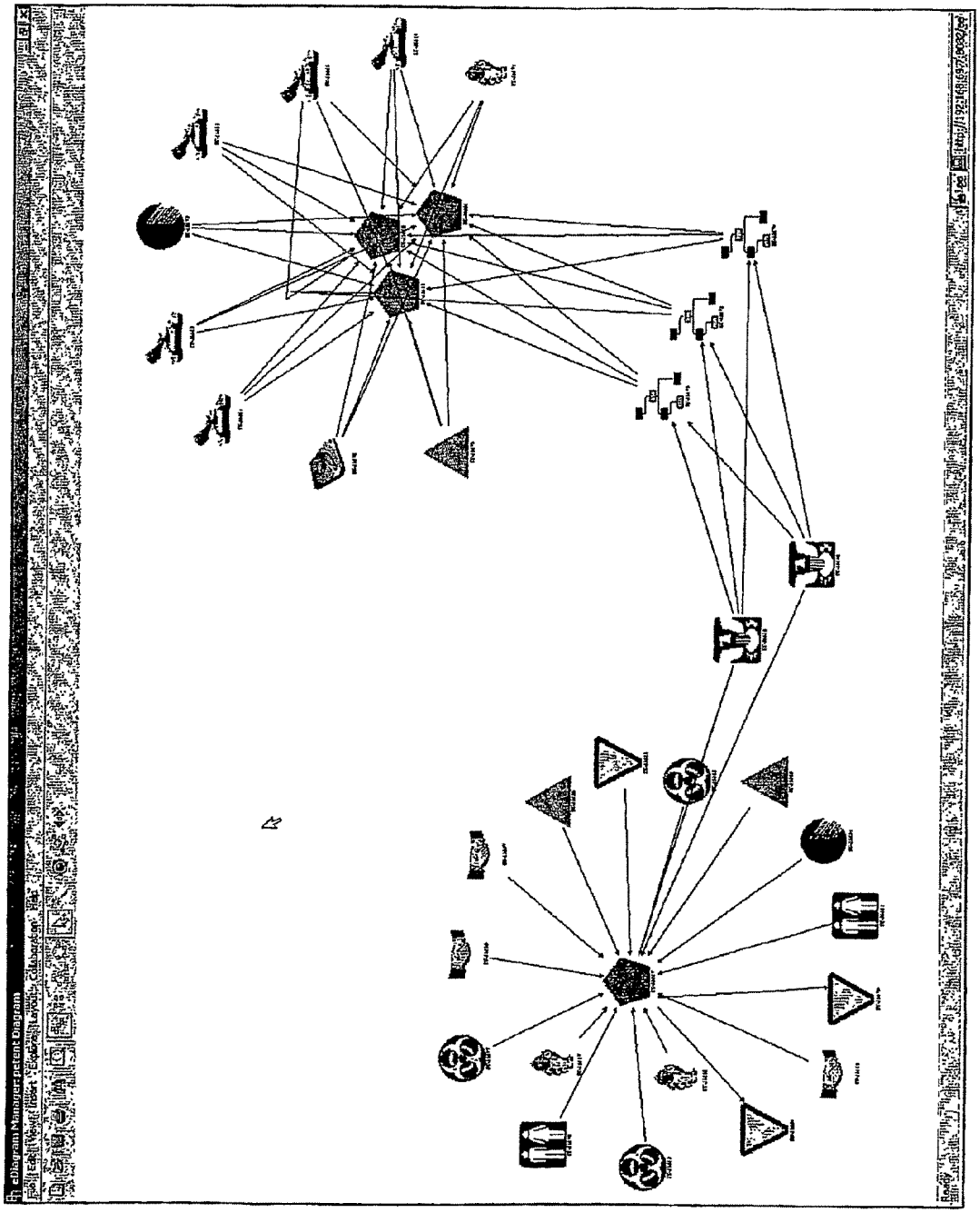
FIG. 7 illustrates a GUI of an exemplary diagrammatic depiction displaying congregations of requirements that are related to subcomponents of a system.

Using the EMR, an element or, in this case, a requirement, would be listed and available as generally readable in an open query-able fashion. This allows the user to organize and aggregate that requirement in more than just the context of one requirements document as the user would in a conventional document-based system. For example, the user may organize and aggregate requirements in a diagrammatic depiction 700 as shown in FIG. 7 that shows congregations of requirements that are related to specific subcomponents of the main system that the user is trying to build.

Diagrammatic depiction 700 shows a subset of elements that may represent requirements as in the previous example. In the example illustrated in diagrammatic depiction 700, there are at least two (2) requirements that are common to the major system components represented in diagrammatic depiction 700. If each generally circular grouping is considered a system component and its related requirements, then the left hand component is related to the right hand component through the two elements generally in the middle of the diagram and linked simultaneously to both.

For example, consider a situation where the user declares that an engine is needed in the process of building an airplane. In a file-based system, the user either declares that through the requirements themselves or through the practice of engineering the airplane, for which there are a thousand requirements that describe how the engine should mount to the wing. In the file-based system, the requirements may be in several spreadsheets or documents. The requirements may be repeated in the spreadsheet and a document, and may be repeated again in a testing suite application. Moreover, the requirements may be further repeated on the architectural drawing of the component. In the EMR of FIG. 1 there would be one instance of the requirement and it would be shared among all applications that needed to reference that instance of that requirement.

Items such as a diagrammatic depiction (e.g. diagrammatic depiction 700), spreadsheet-like depiction, or documentation depiction, are now file independent. The items are just depictions of the core data set.

Figure 8:
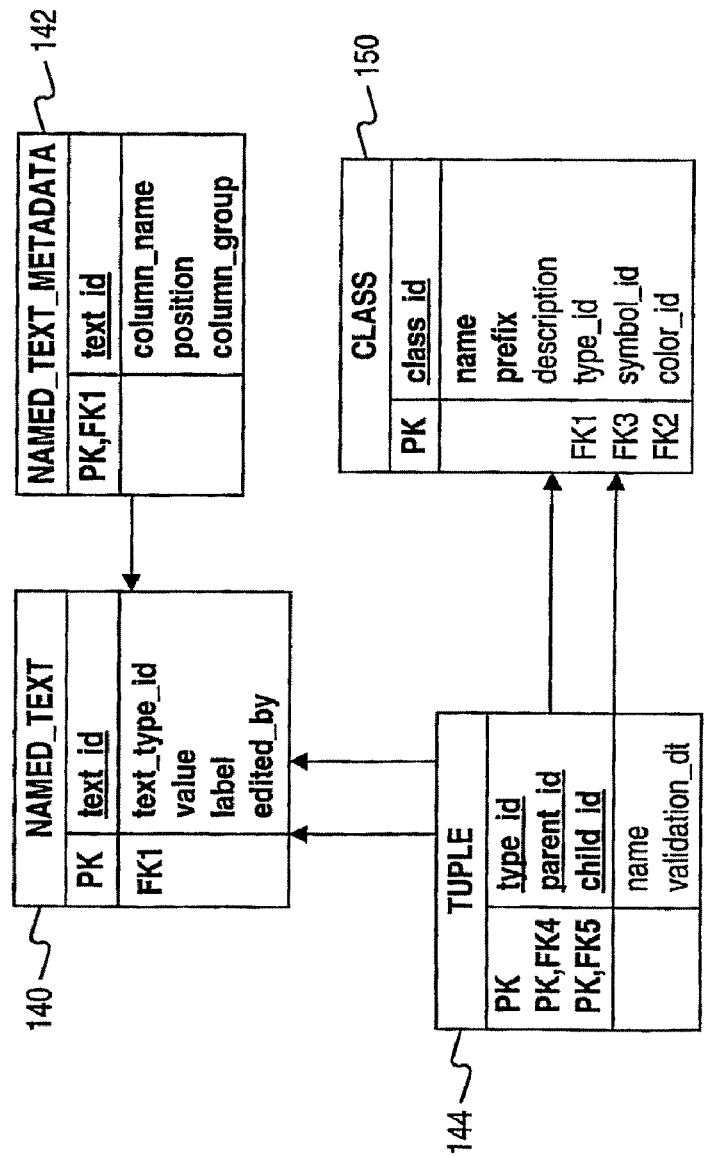
FIG. 8 shows a subset of the exemplary entity-relationship diagram of the EMR, illustrating data tables for storing tuples, named texts and metadata for named texts, etc.

Embodiments of the present invention include a named_text table 140, as shown in FIG. 8. Named_text table 140 provides a powerful normalization of all text that the user may refer to in a system. Text is a ubiquitous descriptor of many things, including graphics. With current techniques, there are textual representations of graphics, notably scalable vector graphic (SVG) from companies like Adobe®, which are textual descriptions that can be rendered into graphics. For example, a textual description may state "draw a red circle with a 50 pixel radius." The textual description can be translated into an actual depiction on the screen. This illustrates that text represents most things or most things can be represented by text, not only graphics through the SVG, but also any data structure through extended markup language. The EMR takes advantage of this by declaring these sets of texts and identifying them with a name and a unique identifier. These sets of texts then become usable in the elements-based implementation in many ways.

Figure 9:
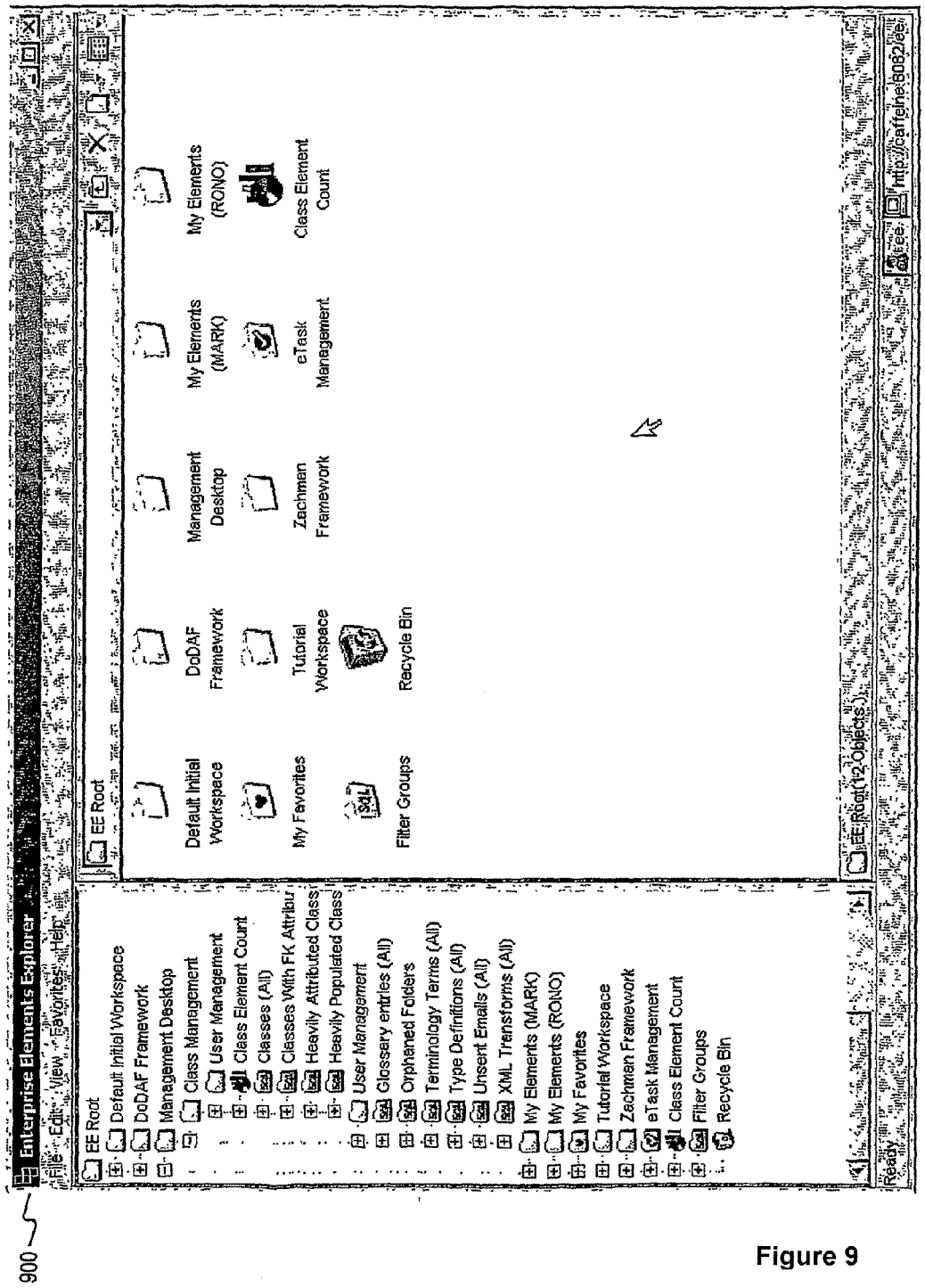
FIG. 9 illustrates a GUI of an exemplary elements explorer.

Embodiments of the present invention include a tuple table 144, as shown in FIG. 9. Tuple table 144 is similar to element_relation table 162, except that tuple table 144 has been separated to store information about the system schema as opposed to the generated user schema. Tuple table 144 relates any identified item to any other identified item and that relationship is created according to a type (e.g., type_id). Given that an entry in named_text table 140 is a thing and that the user may relate the thing to other types of named text, the EMR declares, for the user's convenience, a named_text item that is akin to a folder in an operating system hierarchy. The folder may be called, for example, "My Favorites," or "My Documents," or in this instance, "My Elements." That folder can then be referenced by the user. Next, the EMR may declare 2, 3, 5 or 100 (or any number of) sub-folders. The sub-folders may be referenced by entries in tuple table 144 to the folder and other sub-folders.

The combination of named_text table 140 and tuple table 144 provides to the EMR the capability to create a recursion between named_text types that represent folders to other named_text types that represent folders in a hierarchy. In an embodiment shown in FIG. 9, the EMR may contain a folder called root (e.g. "EE Root"), another folder called "My elements" (e.g. "My Elements (MARK)" and "My Elements (RONO)"), and tuples the root entry in named_text table 140 to the "My Elements" entry in named_text table 140. In doing so, the EMR indicates through elements explorer 900 a hierarchy or a tree or an indenture of the folders. This particular implementation approximates a standard operating system file explorer, in which the user can click and drag and drop folders and other items into a folder in a tree or navigable folder set. Through the same mechanism, an element may be tupled into a folder. In the elements-based implementation, the EMR may use a folder to organize and aggregate random sets of things in the universe.

The EMR may utilize entries in named_text table 140 to name structured query language queries. SQL is a textual language that, describes an interaction or request to a relational database. SQL queries are the mechanism to retrieve data from the database. SQL query is a powerful notion for relational databases and may be implemented as a named_text entry. Unlike a conventional database, e.g., Oracle® or Microsoft SQL Server®, that stores user-generated SQL as a "view," the EMR stores user-generated SQL as a named_text entry. Because the user-generated SQL is an entry in named_text table 140, and since folders exist as entries in named_text table 140 or tuple table 144, the EMR may filter or query entries in named_text table 140 or tuple table 144 into one or more folders.

Thus, if the SQL statement serves as a folder, the results of the SQL statement or the items returned by the query would be the contents of that folder. The SQL statement to the user is therefore a dynamic folder or a SQL folder and no tuple exists between that data set. In other words, elements in the dynamic folder can be placed into other folders. The dynamic folder is executed at run-time if the user selects the dynamic folder and the resulting elements that come back from the query are presented as if they were tupled into that folder. This is a dynamic process and the result set may differ depending on the dynamic data changes. This dynamic process simplifies the organization and provides to the user the ability to locate data through a dynamic folder hierarchy. The dynamic folder hierarchy further includes dynamic folders that change the data set appropriately every time the user visits them.

An example of the dynamic folder capability provided by the EMR is a "My Tasks" folder. Assume that task is an element classification and that user is an attribute of the task. If there are tasks in the system that are assigned to the user, the user may perform a query that directs the EMR to select one or more tasks for which the user is the assigned user. The result of that query may change over time. The administrator may assign a task to someone else, so the task may be deleted or moved to a completed state and the user's folder would only contain a current task set that matches the query as defined by a named_text of that folder. This allows for an extensible method of organizing data of interest and allowing the user to easily find and retrieve data of interest in a large, complex system.

Figure 10:
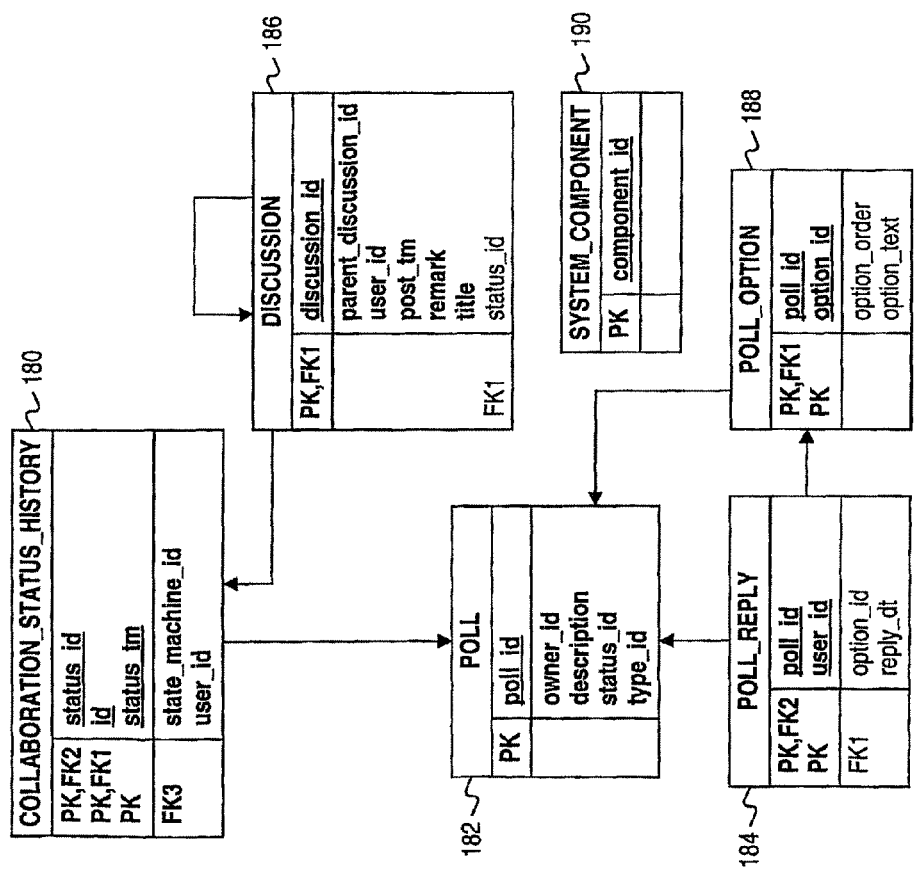
FIG. 10 shows a subset of the exemplary entity-relationship diagram of the EMR, illustrating data tables for storing collaboration status history, polls, discussions, system components, etc.

Embodiments of the present invention, as shown in FIG. 10, include a poll table 182. Poll table 182 may represent a set of identified questions that are in one of several stages of life cycle of an element or set of elements. A poll is a collaborative mechanism that restricts the responses of the participants to one or more predetermined choices which are enumerated in a poll_option table 188. The replies of the participants are recorded in a poll_reply table 184. These poll replies can be analyzed for preference among the voting community and used to record decision making processes regarding any given element or set of elements. This relation is achieved through entries in tuple table 144 (in FIG. 8).

In accordance with still further embodiments of the invention, the EMR includes a discussion table 186, which is similar to poll table 182 as discussion table 186 records collaborative information regarding one or more elements in the system. However, a discussion, which may be stored as entry in discussion table 186, is not forced into a set of structured responses. Instead discussion table 186 allows free-form narrative to be recorded, and replied to by any number of users in the system.

Embodiments of the present invention may further include a collaboration_status_history table 180, which may record all the states that either a discussion or poll moves through in a defined life cycle, similar to element history. Moreover, the user and date and time is recorded with each status change.

In accordance with still further embodiments of the invention, the EMR includes a system_component table 190. The EMR may register components that are programmatic in nature (e.g. Java classes), wherein the components may be executed dynamically as needed (through a process called reflection) as part of element decoration. For example, one or more Java classes may be defined and saved as a record in system_component table 190, then the Java classes may be tupled to elements. At runtime, the Java classes that are referenced may be executed when an element of the Java class is edited or viewed.

Figure 11:
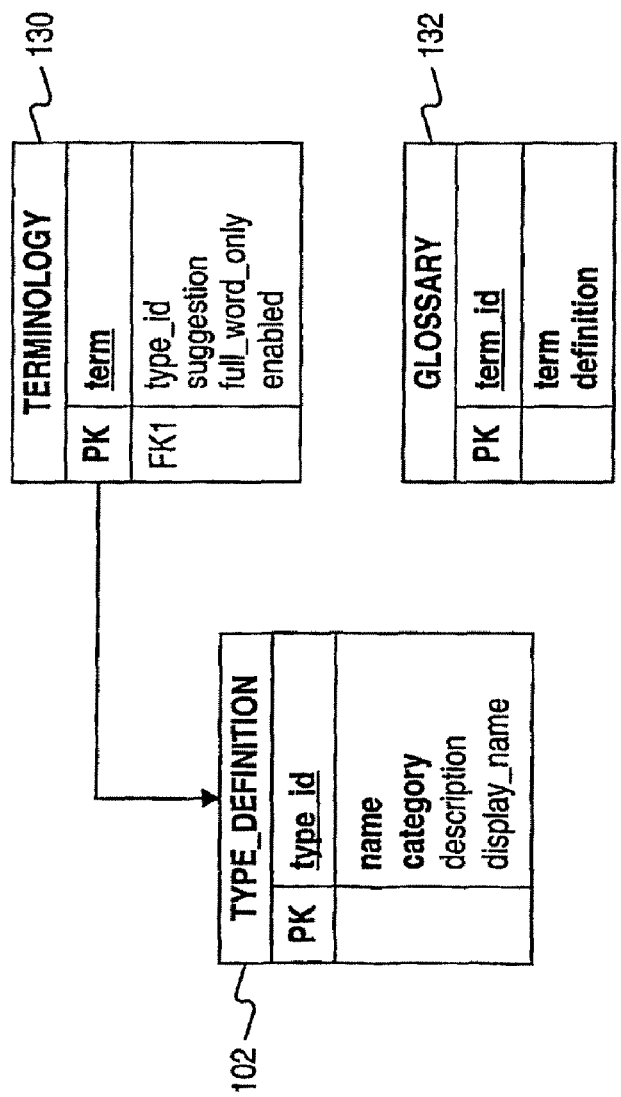
FIG. 11 depicts a subset of the exemplary entity-relationship, diagram of the EMR, illustrating data tables for storing terminology, glossary, etc.

Embodiments of the present invention, as shown in FIG. 11, include a terminology table 130 and a glossary 132. Terminology table 130 may store a list of terminologies that can be used in the system. Glossary table 132 may uniquely identify and define each of the terms stored in terminology table 130.

Figure 12:
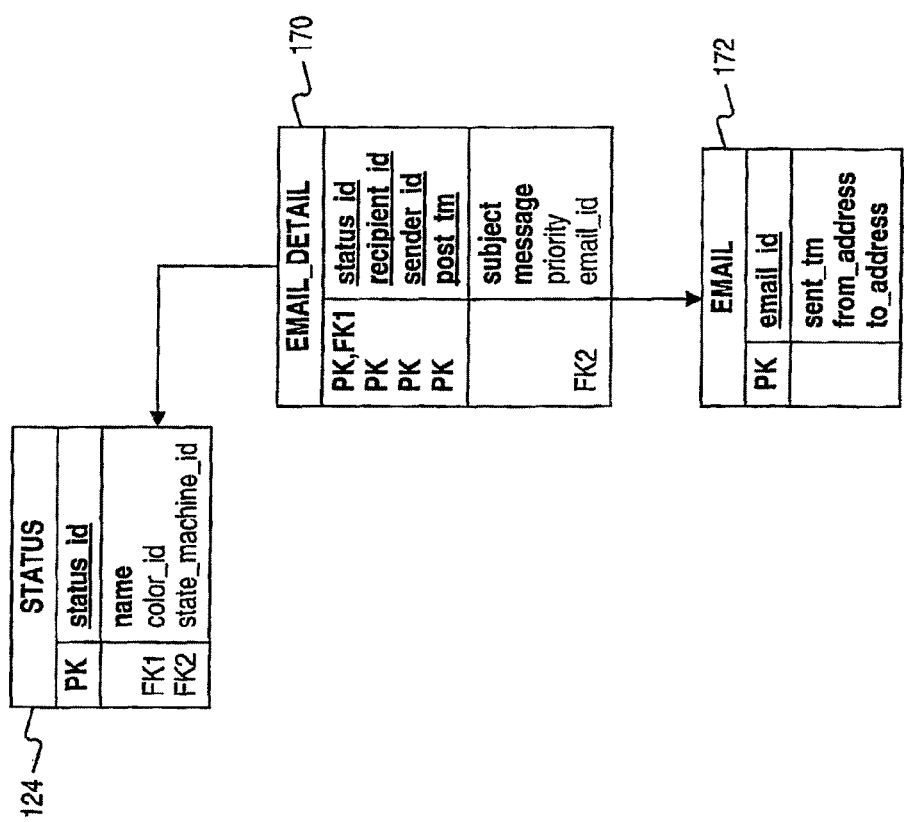
FIG. 12 depicts a subset of the exemplary entity-relationship diagram of the EMR, illustrating data tables for storing emails, email details, etc.

In accordance with embodiments of the invention as shown in FIG. 12, the EMR includes an email table 172 and an email_detail table 170. These tables allow the EMR to populate records in the database that can programmatically be converted from rows in the RDBMS to actual emails using a known protocols such as SMTP and POP. Since the emails stored in email table 172 and email_detail table 170 are also data, the EMR may apply stateful process logic to each email using status, state_machine, and state_machine_transition tables (FIG. 5, elements 120, 122, 124, respectively) to define the lifecycle of an email. Full email history can be maintained in the EMR and new emails can be generated either programmatically when an event occurs, or manually when a user enters an email. Individual messages may be aggregated into one larger email at a time interval specified by an administrator. The aggregated messages may also be sent on demand.

Figure 13:
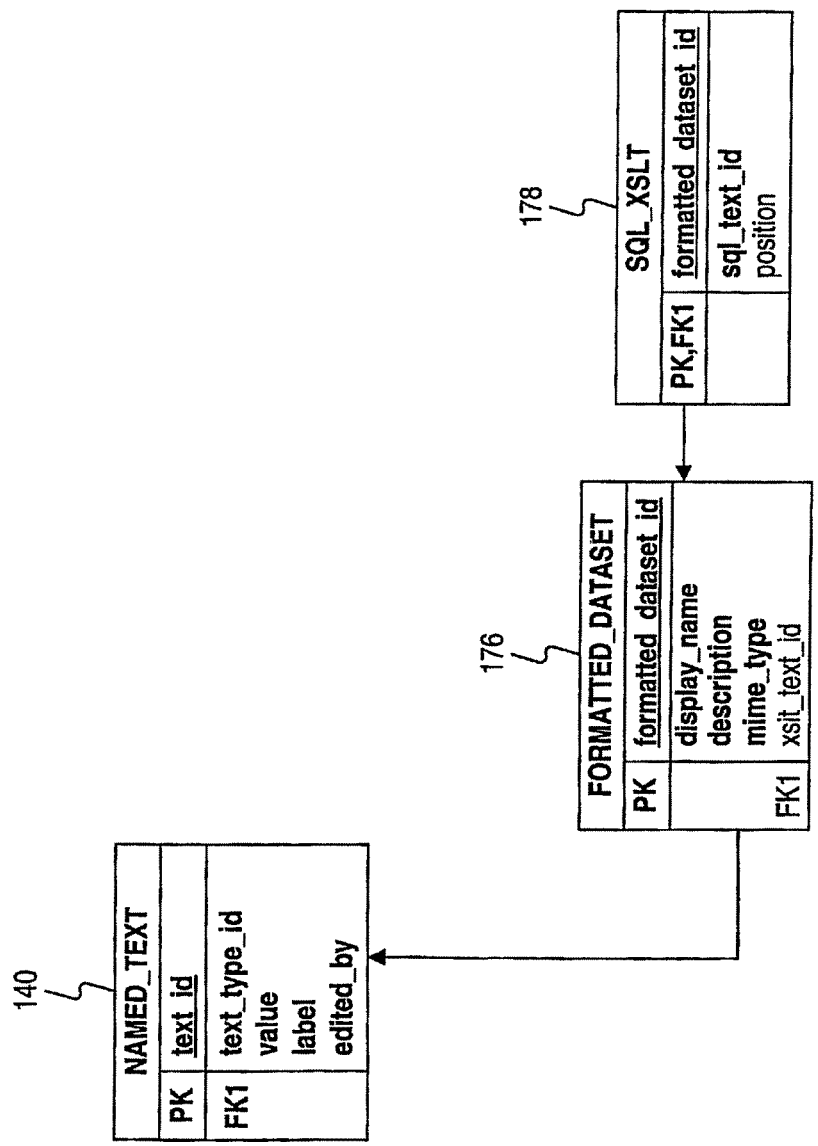
FIG. 13 depicts a subset of the exemplary entity-relationship diagram of the EMR, illustrating data tables for storing formatted dataset, SQL extensible stylesheet language transformations, etc.

In accordance with embodiments of the invention as shown in FIG. 13, the EMR includes a formatted_dataset table 176 and a SQL_XSLT table 178. Together, formatted_dataset table 176 and SQL_XSLT table 178 allow the EMR to create a named "formatted dataset," which applies formatting to a SQL result set. Formatted_dataset table 176 and SQL_XSLT table 178 may work in conjunction with named_text table 140 to relate one or more named text entries (representing SQL statements), which provide the result set(s), with another named text entry (representing XSLT or a formatting definition) which generates a final layout.

Figure 16:
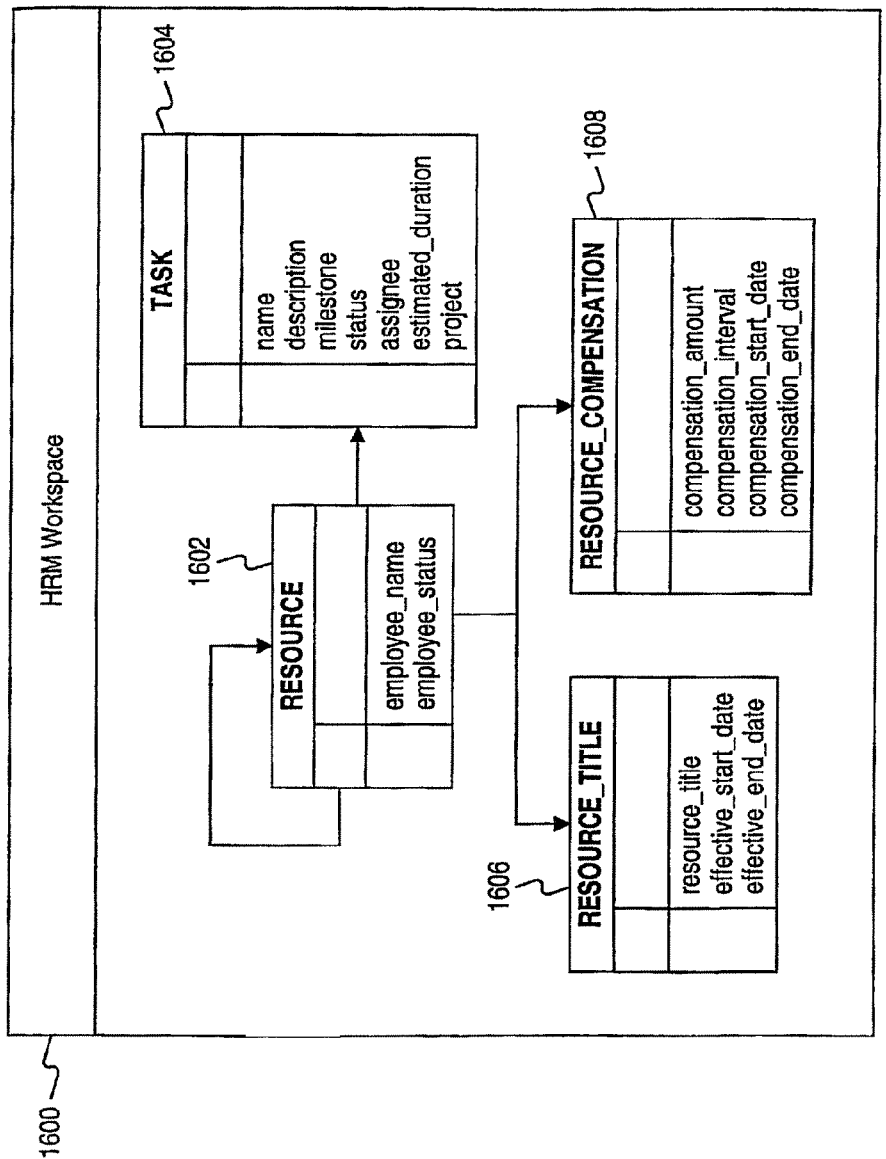
FIG. 16 is a diagram depicting an exemplary Human Resource Management workspace.

To further illustrate the EMR as described above and in FIGS. 1-15, an example is provided to demonstrate the utilization and capability of the EMR, consistent with the present invention, for storing, managing, indexing, interrelating, and/or retrieving data sets, such as large scale and dynamic data sets. One example, as shown in FIG. 16, may be Human Resource Management (HRM). Further examples may include, for instance, a vertical implementation, or schema and associated processes, that may serve the needs of a well defined market, e.g., Enterprise Architecture, Requirements Management, Six Sigma, Resource Planning, Federal Regulatory Compliance, Legal Document Management, Portfolio Management, etc.

In the HRM example, it may be determined that tracking "resources" is desired, Those resources may be people, but may not necessarily be restricted to people, which is a distinction that may be made when defining the implementation. It may further be determined that the resources of interest will in fact be people, and those people will be employees of a specified company. The company may have written policies that determine employment, such as the amount of vacation time each employee may receive, a level of compensation, etc.

Furthermore, it may be determined that the resources may exist in a hierarchy, e.g., have a place in an organization chart, and that tasks should be identified and assigned to these resources as needed. Steps may be taken within the EMR to support such system requirements.

A workspace (e.g., HRM Workspace 1600 of FIG. 16) may optionally be entered into the ERM (e.g. workspace_object table 106 and workspace table 108 of FIGS. 1 and 2) to segregate the HRM information from other possible data sets in the EMR if desired.

A schema would be logically defined that encompassed the articulated needs of the system. In this case perhaps a resource class 1602 (of FIG. 16) would be declared with attributes of employee_name, employee_ID, and employee_status. The employee_status attribute may be of type state_machine, allowing the stateful process of employment to be declared according to the rules of the company.

It may further be determined that a resource may change title and salary over time, and other classes, such as a resource_title class 1606 and a resource_compensation class 1608, would be declared each with a pointer to resource class 1602 such as resource_ID and other appropriate attributes such as resource_title, effective_start_date, and effective_end_date. Furthermore, resource_compensation class 1608 may similarly contain compensation_amount, compensation_interval, compensation_start_date, and compensation_end_date.

Tasks would also be similarly defined as a task class 1604 with, for example, a name, a description, a milestone indicator, a status, an assignee, an estimated_duration, and a project indicator.

To implement these classes, data would be entered into the EMR representing these structures. The order of implementation, as illustrated below, is exemplary and does not limit embodiments of the present invention.

Entries may be made into class table 150 (of FIGS. 1 and 2), one each for resource, task, resource_title, and resource_compensation. Entries may be made into attribute table 110 (of FIGS. 1 and 2) for each employee_name, employee_ID, employee_status, employee_title, compensation_interval, compensation_amount, compensation_start_date, compensation_end_date, status, assignee, estimated_duration, and project.

As further definition, entries may be made into state_machine table 120, state_machine_transition table 122, and status table 124 (of FIGS. 1 and 5) to declare the available selections of the status and employee_status attributes. Further entries may be placed into list_option table 114 (of FIGS. 1 and 2) to specify the available resource_titles that may be assigned to resource or resources.

Entries may then be made into class_attribute table 112 (of FIGS. 1 and 2) to associate the appropriate attributes with their respective classes. This may all be done via any data insertion method available, e.g. a user interface, etc.

Once these class_attribute records have been entered into class_attribute table 112, the EMR is ready for use. Users have the capability to add resources, create tasks, assign them to the resources, report on how many tasks are completed, etc. Users may also create folders to organize projects (see, e.g., FIG. 9) and view diagrams (see, e.g., FIGS. 4 and 7) of which resources are committed to which tasks without any further programmatic effort. Users may also be able to collaborate on tasks by discussing ramifications or polling a subset of users to determine specific answers to to-be-determined elements.

In this example, the resource hierarchy may be constructed by linking one resource to another recursively (see, e.g., FIG. 16). This may be done either via the record editing capabilities or by using the diagramming tool (see, e.g., FIGS. 4 and 7) to draw a line from one resource to another. The diagrammatic representation of the organization chart is capable of immediately expand an individual to supervisors, peers, or subordinates. The diagrammatic representation may also show all related tasks to one or more of those individuals if desired. By providing those capabilities, the diagrammatic representation allows for visualization of tasking overloads or underutilized resources, etc.

If the EMR does not provide a specific aggregation or subsetting of tasks or resources, one or more named_text entries in named_text table 140 (of FIGS. 1 and 8) may be defined that return the appropriate results. If the default display of those results is insufficient for the business needs, then one or more formatted_dataset entries in formatted_dataset table 176 (of FIGS. 1 and 13) and SQL_XSLT entries in SQL_XSLT table 178 (of FIGS. 1 and 13) may be defined to convert the available results into any desired final output.

In this example, when the user edits or inserts data in the EMR, the data may be stored in an appropriate element_attr_c# table 164 (of FIGS. 1 and 3) that was automatically constructed as part of the class definition step above. Moreover, any modifications may automatically be recorded as history in element_history table 166 (of FIGS. 1 and 3).

The above-described exemplary scenario may be followed for any given schema. A full schema does not need to be defined before the EMR may be used. If for instance only resources were defined, then resource information could be entered, and organization hierarchies may be defined at a later date; the tasking information may be added without disruption to the EMR. As a further example, additional, attributes may be added to the resources themselves at a later date if the attributes are deemed necessary. As another example, the EMR's user interfaces may automatically adjust to the current definition to allow seamless upgrades of the data models.

Figure 17:
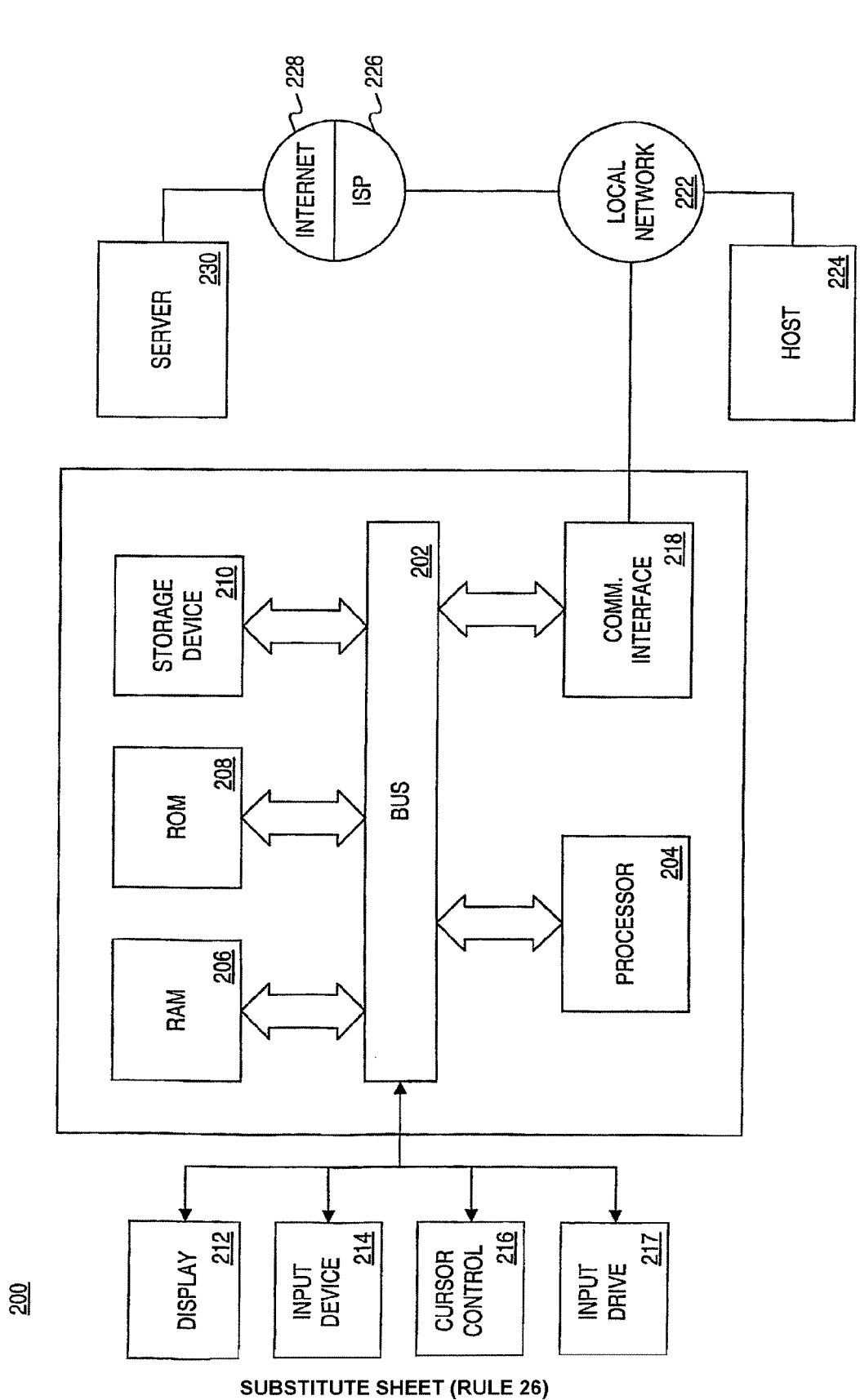
FIG. 17 is a diagram depicting an exemplary computer system in which systems and methods consistent with the principles of the elements metadata repository of FIG. 1 may be implemented.

Systems and methods consistent with the present invention may be implemented by computers organized in a conventional distributed processing system architecture. FIG. 17 is a block diagram illustrating a computer system 200 in which an embodiment consistent with the invention may be implemented. Computer system 200 includes a computer 201 having a bus 202 or other communication mechanism for communicating information, and a processor 204 coupled with bus 202 for processing information. Computer 201 also includes a main memory, such as random access memory (RAM) 206 or other dynamic storage device, coupled to bus 202 for storing information and instructions by processor 204. RAM 206 also may be used for storing temporary variables or other intermediate information during execution of instructions to be executed by processor 204. During operation, some or all portions of an operating system (not shown) are loaded into RAM 206. Computer 201 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer 201 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device may have two degrees of freedom in two axes, a first axis (e.g., x) and a second axis (e.g., y), which allow the device to specify positions in a plane.

System 200 may further include an input drive device 217, such as a CD reader, for reading high-capacity computer-readable media, such as CD-ROMs and CDRs.

The invention is related to the use of computer system 200 for manipulating data sets for, to take an example, corporate or engineering exercises. According to one implementation, systems and methods consistent with the present invention collect system information and store it in a central database in response to processor 204 executing one or more sequences of one or more instructions contained in RAM 206. Such instructions may be read into RAM 206 from a computer-readable medium via an input device such as storage device 210. Execution of the sequences of instructions contained in main memory 206 causes processor 204 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

Computer 201 also includes a communication interface 218 coupled to bus 202. Communication interface 218 provides a two-way data communication coupling to a network link 220 that is connected to local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to host computer 224 and/or to data equipment operated by Internet Service Provider (ISP) 226. ISP 226, in turn, provides data communication services through the Internet 228. Local network 222 and Internet 228 both use electric, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be loaded in RAM 206 and executed by processor 204 as it is received. Alternatively, or in addition, it may be stored in storage device 210, or other non-volatile storage for later execution. In this manner, computer system 200 may obtain application code in the form of a carrier wave.

Although computer system 200 is shown in FIG. 17 as being connectable to one server 230, those skilled in the art will recognize that computer system 200 may establish connections to multiple servers on Internet 228. Such servers may include an HTML-based Internet application, which may provide information to computer system 200 upon request in a manner consistent with the present invention.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A computerized system for manipulating data sets, comprising:
a processor; and
a data repository, the data repository being adapted to process, retrieve, and store data contained in the data sets and one or more layers of metadata of the data in the data sets, comprising:
an element module configured to store and uniquely identify a plurality of elements, wherein each of the elements is identified by a unique element identification;
an element relation module configured to store one or more relationships between the elements in the element module;
a class module configured to define at least one class of the elements and store the class;
an attribute module configured to define one or more attributes and store the attributes;
a class attribute module configured to define and store one or more class-attribute associations between at least one of the attributes and the class;
a type definition module configured to define and store one or more types of the class, the attributes related to the class, and the relationships between the elements;
a state machine module configured to store one or more state machine types associated with at least one of the elements; and
a status module configured to store one or more statuses of each state machine.

2. The computerized system of claim 1, wherein the data repository further comprises:
a state machine transition module configured to store a transition from a first status to a second status.

3. The computerized system of claim 2, wherein the state machine module defines and stores at least one forward transition connection, the forward transition connection restricting the transition from the first status to the second status.

4. The computerized system of claim 1, wherein the type definition module defines a type including at least one of a boolean type, a picklist type, and a state machine type.

5. The computerized system of claim 4, wherein the data repository further comprises:
a list option module configured to enumerate one or more picklist attributes of the picklist type.

6. The computerized system of claim 2, wherein the data repository further comprises:
a named text module configured to store textual representations of query, control, and display mechanisms that relate to the elements.

7. The computerized system of claim 6, wherein the data repository further comprises:
a tuple module configured to generate and store one or more tuples, wherein each of the tuples associates a subset of the elements in accordance to one of the types associated with the subset of the elements.

8. The computerized system of claim 1, wherein each of the class-attribute associations is identified by a logical name and a name of the class.

9. The computerized system of claim 8, wherein the data repository further comprises:
an element attribute module for each of the at least one class, the element attribute module configured to define and store the attributes of the elements in the class, wherein the element attribute module is identified using the name of the class.

10. The computerized system of claim 9, wherein the data repository further comprises:
an element history module configured to store one or more indicators of modification to the elements.

11. The computerized system of claim 10, wherein the data repository further comprises:
an element document module configured to store one or more formatting data for grouping and displaying a subset of the elements.

12. The computerized system of claim 1, wherein the processor is configured to generate a data model of the elements based on the data in the data sets and the layers of metadata stored in the data repository.

13. The computerized system of claim 1, wherein the processor is configured to generate a dynamic user-interface for accessing and manipulating the elements based on the data in the data sets and the layers of metadata stored in the data repository.

14. A method for manipulating data sets, comprising:
storing and uniquely identifying a plurality of elements in a data repository, each of the elements identified by a unique element identification, wherein the data repository is adapted to process, retrieve, and store data contained in the data sets and one or more layers of metadata of the data in the data sets;
storing, in the data repository, one or more relationships between the elements;
defining at least one class of the elements and storing the class in the data repository;
defining one or more attributes and storing the attributes in the data repository;
defining one or more class-attribute associations between at least one of the attributes and the class and storing the class-attribute associations in the data repository;
defining one or more types of the class, the attributes related to the class, and the relationships between the elements, and storing the types in the data repository;
defining one or more state machines and defining and storing a type for each state machine associated with at least one of the elements; and
defining one or more statuses for each state machine and storing the statuses in the data repository.

15. The method of claim 14, further comprising:
defining and storing a transition from a first status to a second status in the data repository.

16. The method of claim 15, wherein the type for each state machine comprises at least one forward transition connection, the forward transition connection restricting the transition from the first status to the second status.

17. The method of claim 14, wherein the one or more types of the class comprise a type including at least one of a boolean type, a picklist type, and a state machine type.

18. The method of claim 17, further comprising:
enumerating one or more picklist attributes of the picklist type and storing the enumerated picklist attributes in the data repository.

19. The method of claim 15, further comprising:
storing, in the data repository, textual representations of query, control, and display mechanisms that relate to the elements.

20. The method of claim 19, further comprising:
generating one or more tuples, each of the tuples associating a subset of the elements in accordance to one of the types associated with the subset of the elements, and storing the tuples in the data repository.

21. The method of claim 14, wherein each of the class-attribute associations is identified by a logical name and a name of the class.

22. The method of claim 21, further comprising:
defining, for each of the at least one class, a set of the attributes of the elements in the class, wherein the set is identified using the name of the class, and storing the set in the data repository.

23. The method of claim 22, further comprising:
storing, in the data repository, one or more indicators of modification to the elements.

24. The method of claim 23, further comprising:
storing, in the data repository, one or more formatting data for grouping and displaying a subset of the elements.

25. The method of claim 14, further comprising:
generating a data model of the elements based on the data in the data sets and the layers of metadata stored in the data repository.

26. The method of claim 14, further comprising:
generating a dynamic user-interface for accessing and manipulating the elements based on the data in the data sets and the layers of metadata stored in the data repository.

27. A non-transitory computer-readable medium storing a computer-executable program which, when executed by a processor performs a method comprising:
storing and uniquely identifying a plurality of elements in a data repository, each of the elements identified by a unique element identification, wherein the data repository is adapted to process, retrieve, and store data contained in the data sets and one or more layers of metadata of the data in the data sets;
storing, in the data repository, one or more relationships between the elements;
defining at least one class of the elements and storing the class in the data repository;
defining one or more attributes and storing the attributes in the data repository;
defining one or more class-attribute associations between at least one of the attributes and the class and storing the class-attribute associations in the data repository;
defining one or more types of the class, the attributes related to the class, and the relationships between the elements, and storing the types in the data repository;
defining one or more state machines and defining and storing a type for each state machine associated with at least one of the elements; and
defining one or more statuses for each state machine and storing the statuses in the data repository.

28. The computer-readable medium of claim 27, wherein the method further comprises:
defining and storing a transition from a first status to a second status in the data repository.

29. The computer-readable medium of claim 28, wherein the type for each state machine comprises at least one forward transition connection, the forward transition connection restricting the transition from the first status to the second status.

30. The computer-readable medium of claim 27, wherein the one or more types of the class comprise a type including at least one of a boolean type, a picklist type, and a state machine type.

31. The computer-readable medium of claim 30, wherein the method further comprises:
enumerating one or more picklist attributes of the picklist type and storing the enumerated picklist attributes in the data repository.

32. The computer-readable medium of claim 28, wherein the method further comprises:
storing, in the data repository, textual representations of query, control, and display mechanisms that relate to the elements.

33. The computer-readable medium of claim 32, wherein the method further comprises:
generating one or more tuples, each of the tuples associating a subset of the elements in accordance to one of the types associated with the subset of the elements, and storing the tuples in the data repository.

34. The computer-readable medium of claim 27, wherein each of the class-attribute associations is identified by a logical name and a name of the class.

35. The computer-readable medium of claim 34, wherein the method further comprises:
defining, for each of the at least one class, a set of the attributes of the elements in the class, wherein the set is identified using the name of the class, and storing the set in the data repository.

36. The computer-readable medium of claim 35, wherein the method further comprises:
storing, in the data repository, one or more indicators of modification to the elements.

37. The computer-readable medium of claim 36, wherein the method further comprises:
storing, in the data repository, one or more formatting data for grouping and displaying a subset of the elements.

38. The computer-readable medium of claim 27, wherein the method further comprises:
generating a data model of the elements based on the data in the data sets and the layers of metadata stored in the data repository.

39. The computer-readable medium of claim 27, wherein the method further comprises:
generating a dynamic user-interface for accessing and manipulating the elements based on the data in the data sets and the layers of metadata stored in the data repository.

* * * * *